United States Patent [19]

Kawana et al.

[11] Patent Number: 5,495,341
[45] Date of Patent: Feb. 27, 1996

[54] IMAGE PROCESSING APPARATUS WHICH SELECTS FROM ONE OF PLURAL GENERATED CLOCK COUNTS

[75] Inventors: Takashi Kawana, Yokohama; Kaoru Seto, Chigasaki; Hiroshi Mano, Tokyo; Hiromichi Yamada, Yokohama; Atsushi Kashihara, Hachioji; Tetsuo Saito, Tokyo, all of Japan

[73] Assignee: Canon Kabushiki Kaisha, Tokyo, Japan

[21] Appl. No.: 847,673

[22] Filed: Mar. 4, 1992

[30] Foreign Application Priority Data

| Mar. 6, 1991 | [JP] | Japan | 3-039810 |
| May 16, 1991 | [JP] | Japan | 3-111747 |
| Jun. 13, 1991 | [JP] | Japan | 3-141931 |

[51] Int. Cl.⁶ .................. H04N 1/40; G01D 9/42
[52] U.S. Cl. ..................... 358/298; 347/224
[58] Field of Search ................. 358/296, 298, 358/448, 453, 455, 456; 346/108; 347/224

[56] References Cited

U.S. PATENT DOCUMENTS

| 4,905,022 | 2/1990 | Nagasawa | 346/108 |
| 4,926,268 | 5/1990 | Kawamura et al. | 358/298 X |
| 5,130,791 | 7/1992 | Abe | 358/453 X |
| 5,172,132 | 12/1992 | Haneda et al. | 358/296 X |

Primary Examiner—Peter S. Wong
Assistant Examiner—Eric Frahm
Attorney, Agent, or Firm—Fitzpatrick, Cella, Harper & Scinto

[57] ABSTRACT

An image processing apparatus having an input device for receiving a multivalue image signal, a generating unit for generating a plurality of count clocks, a counting unit for counting the count clocks supplied from the generating unit, a pulse width modulation unit for performing a pulse width modulation by using an output from the counting unit and the multivalue image signal and a selection unit for selecting one count clock from a plurality of the count clocks in accordance with a value of the multivalue image signal.

13 Claims, 36 Drawing Sheets

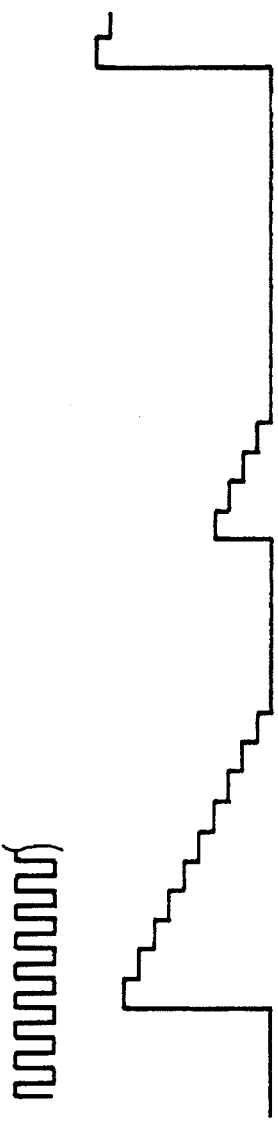
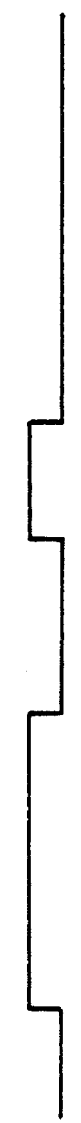
FIG. 5A (PRIOR ART) IMAGE CLK
FIG. 5B (PRIOR ART) MULTI-LEVEL IMAGE DATA
FIG. 5C (PRIOR ART) COUNT CLK
FIG. 5D (PRIOR ART) COUNT VALUE
FIG. 5E (PRIOR ART) CARRY OUTPUT OF COUNTER
FIG. 5F (PRIOR ART) Q OUTPUT OF J·K F/F

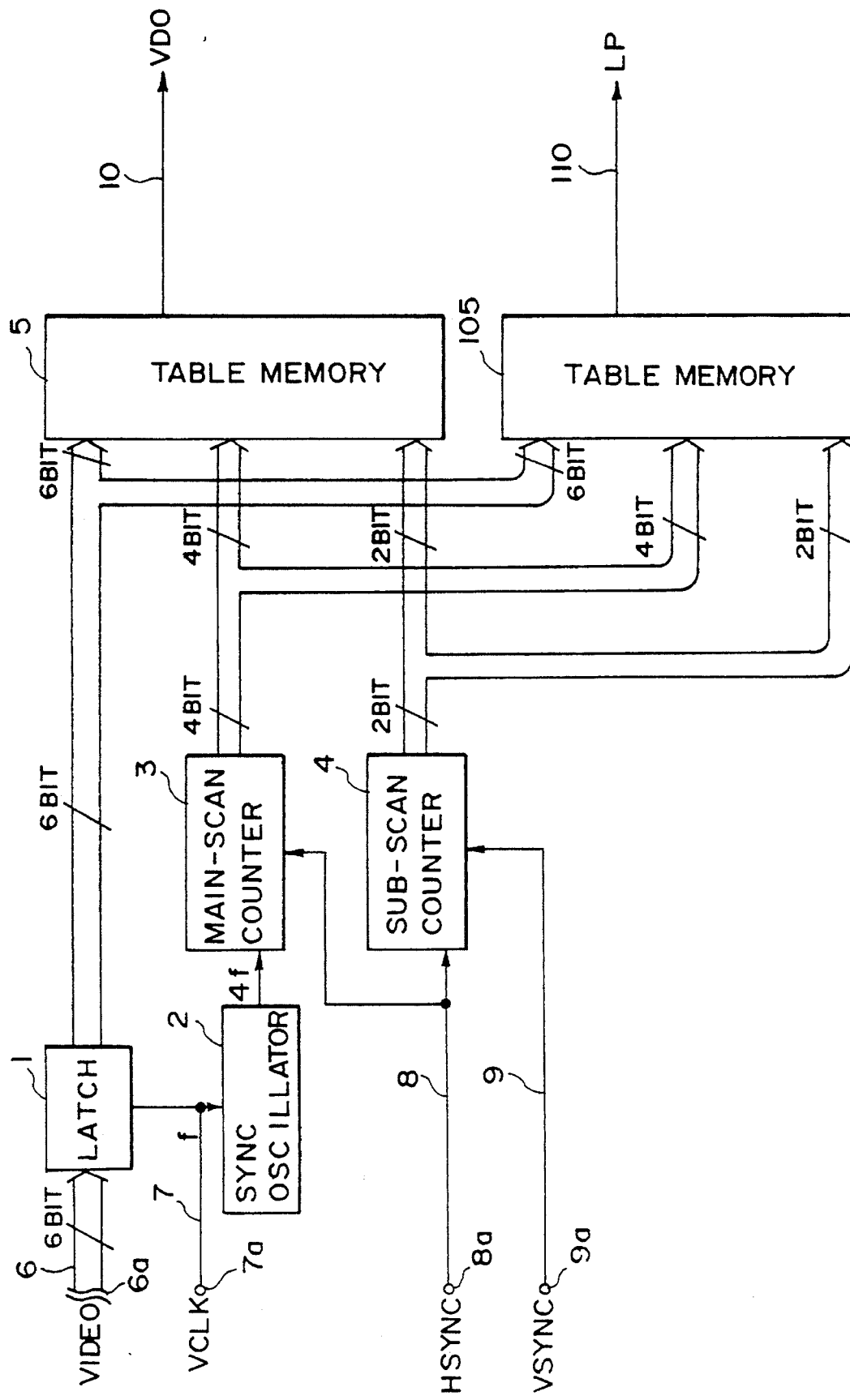

| MEMORY ADDRESS | DATA |
|---|---|
| 000000000000 | 0 |
| 000000000001 | 0 |
| 000000000010 | 0 |
| 000000000011 | 0 |
| ⋮ | |
| 000000110000 | 0 |
| 000000110001 | 0 |
| 000000110010 | 0 |
| 000000110011 | 0 |
| 000000110100 | 1 |
| 000000110101 | 1 |
| ⋮ | |
| 000000111111 | 1 |
| 000001000000 | 0 |
| 000001000001 | 0 |
| ⋮ | |
| 000001100000 | 0 |
| 000001100001 | 0 |
| 000001100010 | 0 |
| 000001100011 | 0 |
| 000001100100 | 1 |
| 000001100101 | 1 |
| 000001100110 | 1 |
| ⋮ | |
| 000001111111 | 0 |

F I G. 10C

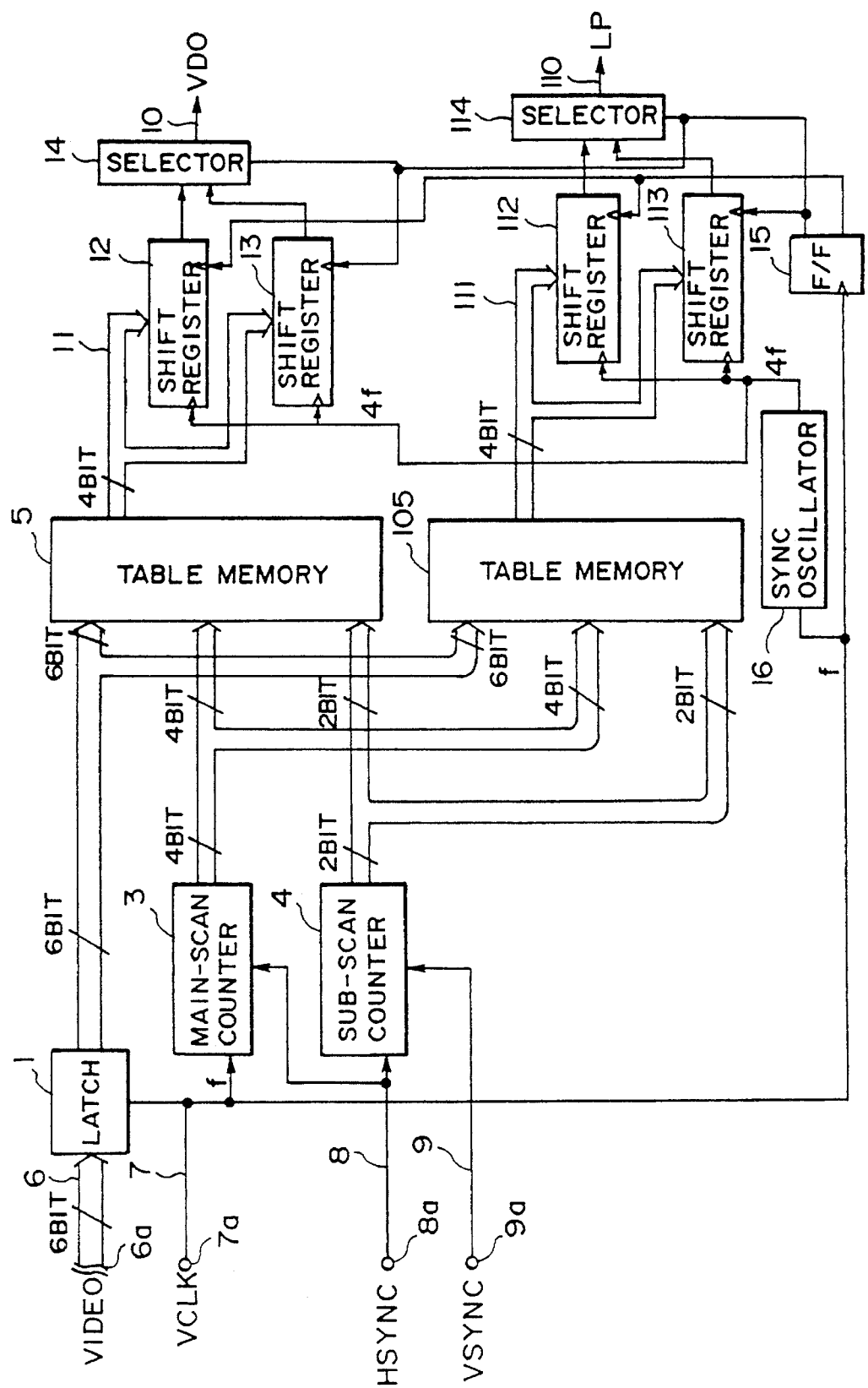
F I G. 12

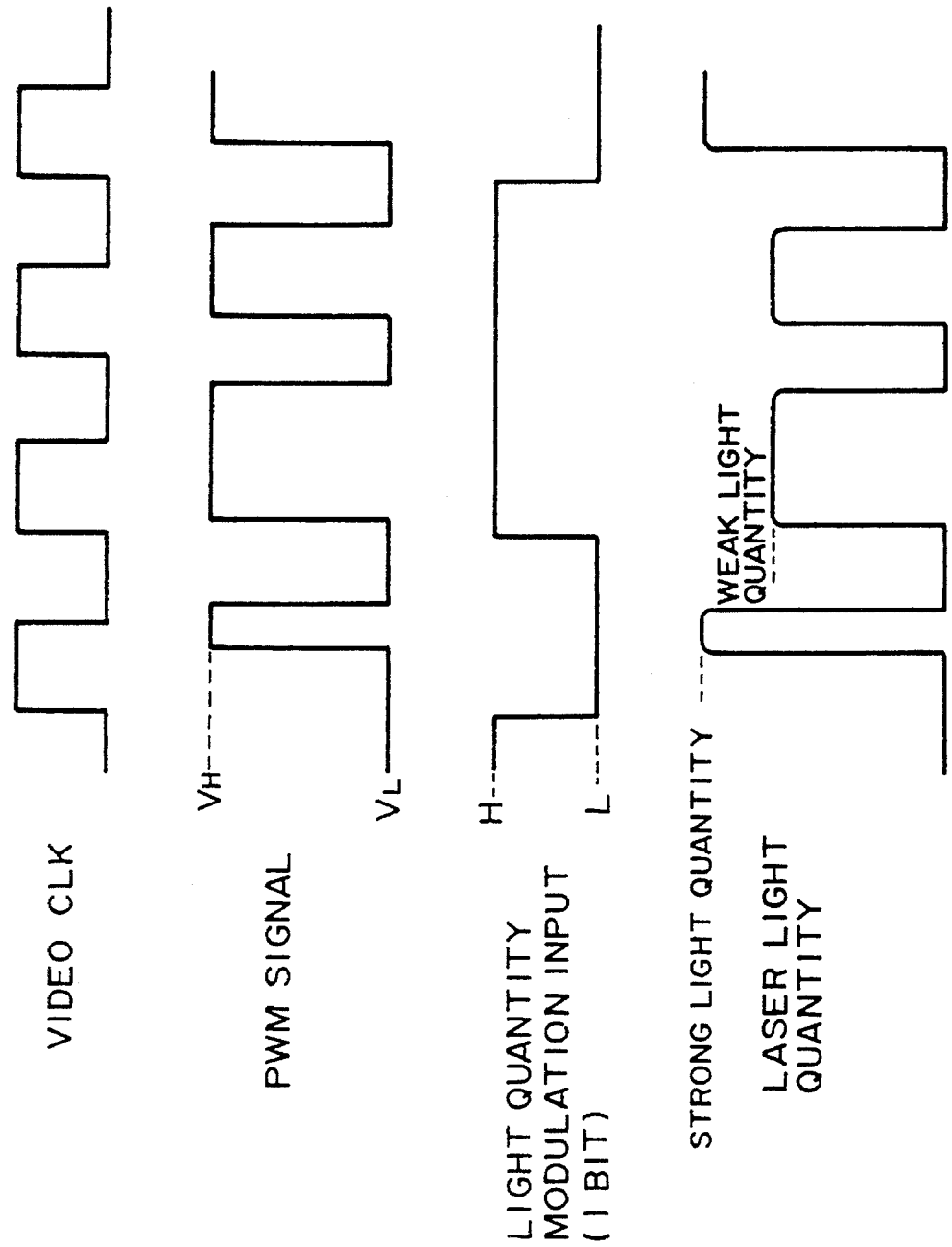

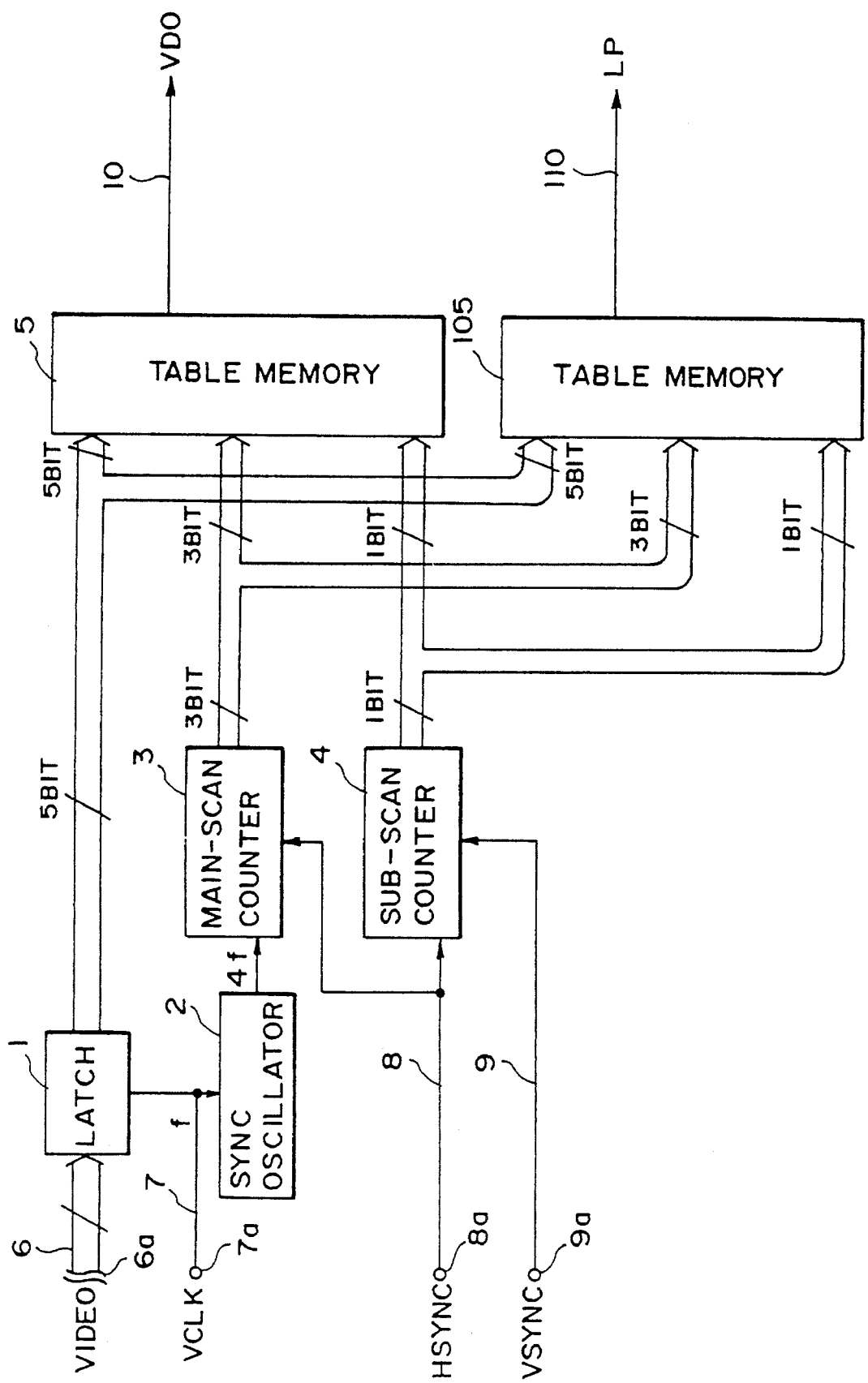
F I G. 20

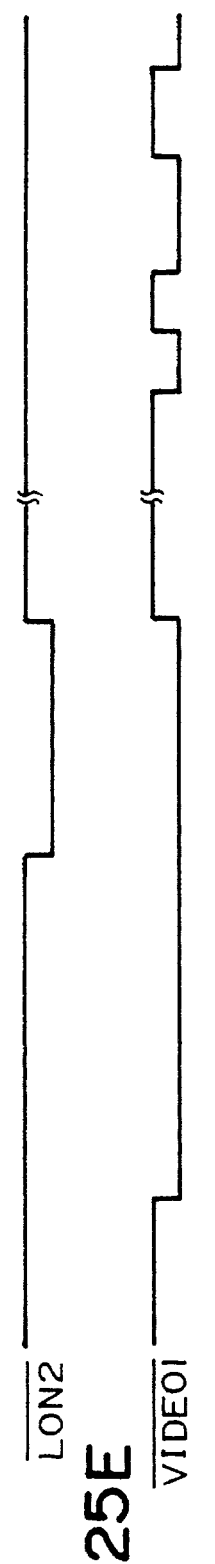
FIG. 25A  LASER LIGHT QUANTITY SET START — APC OPERATION / PRINT OPERATION
FIG. 25B  $\overline{VDO1}$
FIG. 25C  $\overline{VDO2}$
FIG. 25D  $\overline{LON1}$
FIG. 25E  $\overline{LON2}$
FIG. 25F  $\overline{VIDEO1}$
FIG. 25G  $\overline{VIDEO2}$

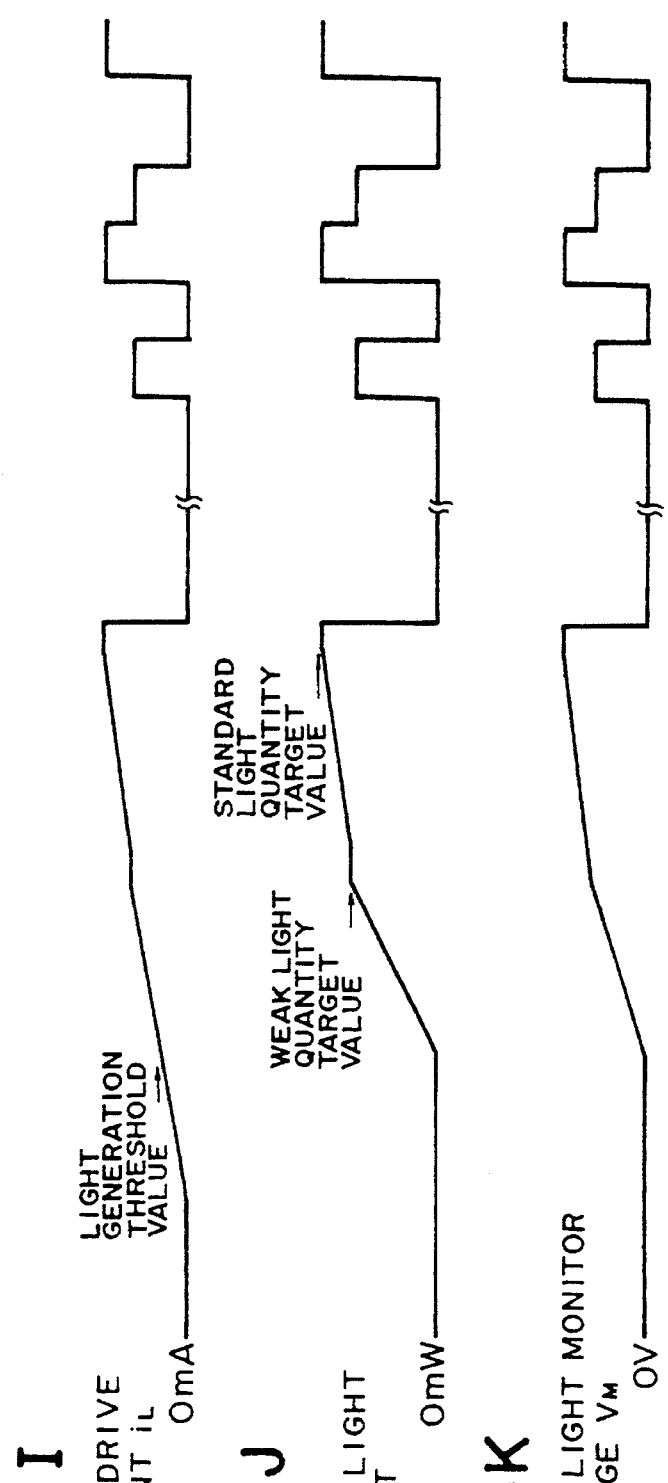
FIG. 25H APC1 0V
FIG. 25I APC2 0V
FIG. 25J LASER DRIVE CURRENT iL 0mA — LIGHT GENERATION THRESHOLD VALUE
FIG. 25K LASER LIGHT OUTPUT 0mW — WEAK LIGHT QUANTITY TARGET VALUE / STANDARD LIGHT QUANTITY TARGET VALUE
FIG. 25L LASER LIGHT MONITOR VOLTAGE $V_M$ 0V

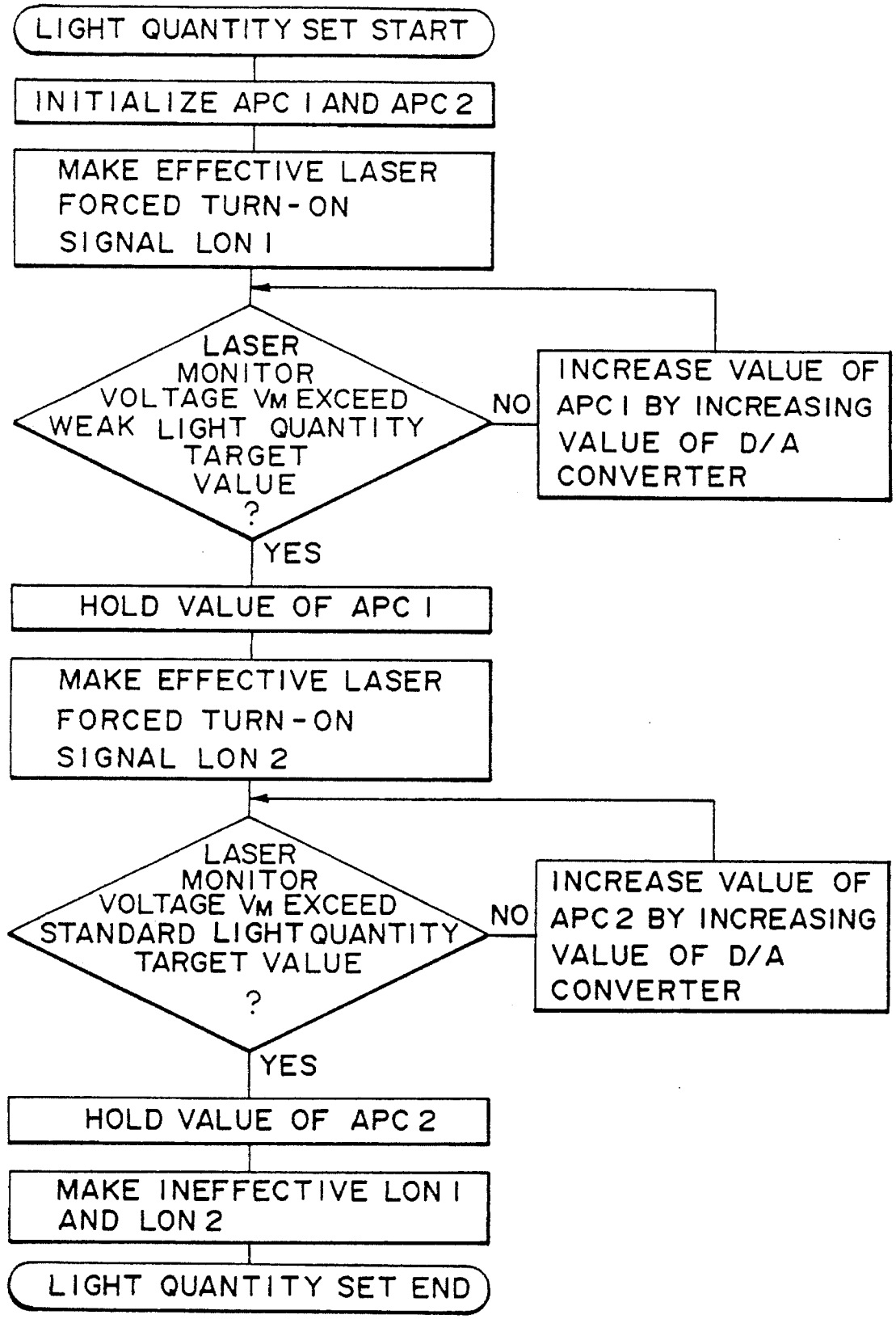
F I G. 27

FIG. 29

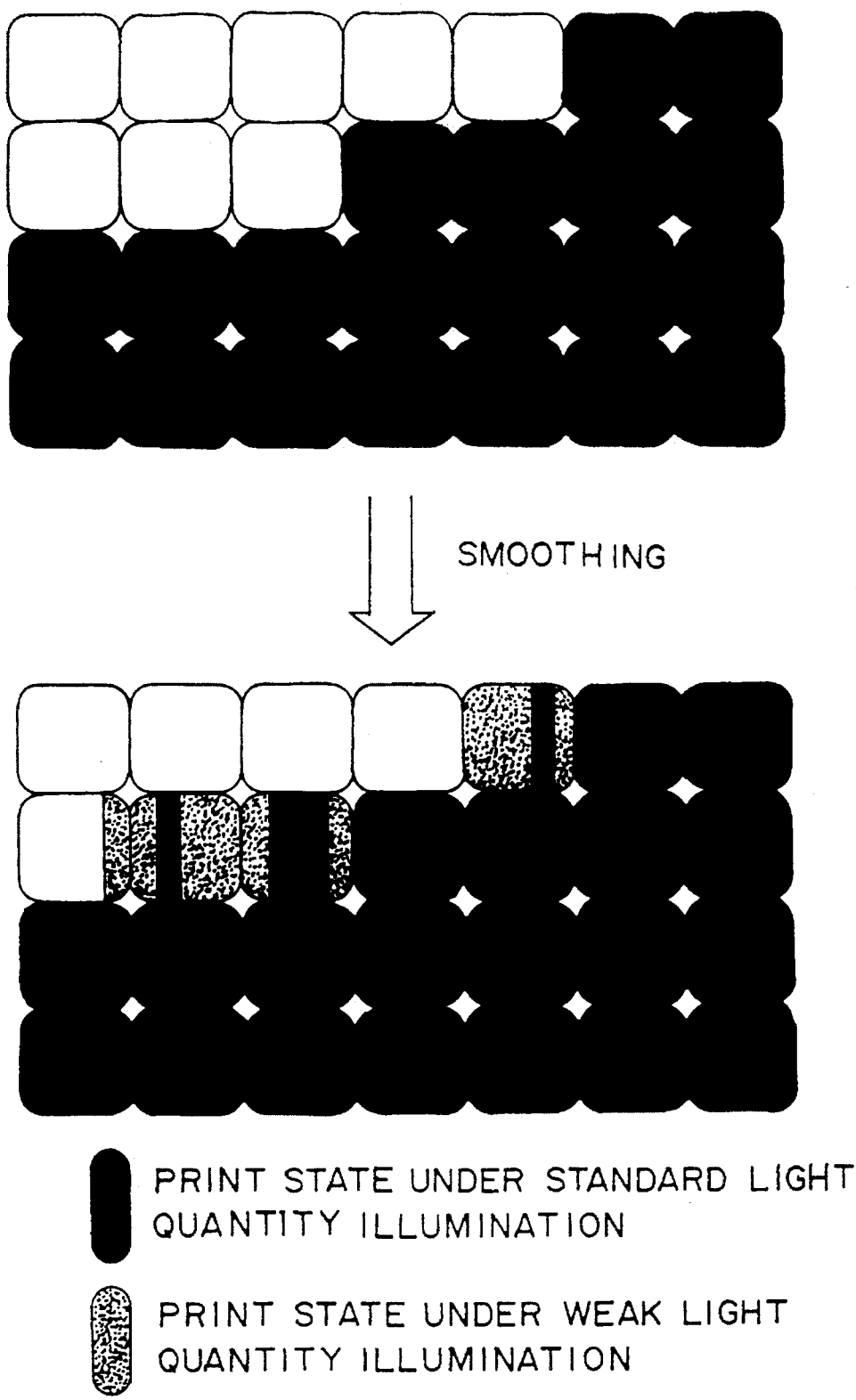
F I G. 30

IMAGE PROCESSING APPARATUS WHICH SELECTS FROM ONE OF PLURAL GENERATED CLOCK COUNTS

BACKGROUND OF THE INVENTION

1. Field of the Invention

The present invention relates to a recording apparatus such as a laser beam printer, and, more particularly to an image processing apparatus which receives multi-value signals transmitted from an external apparatus such as a host computer and which is capable of reproducing high quality images including printed halftone images.

2. Related Background Art

Recently, a laser beam printer has become important with the wide use of the DTP, and therefore there is a desire for the laser beam printer to output high quality and high density images. Furthermore, printers capable of expressing halftone images have been suggested recently in the aforesaid state.

FIG. 4 illustrates an image processing portion of a printer capable of expressing halftone images. When 4-bit multi-value image data supplied from external equipment (omitted from illustration) is loaded in a counter 31 in synchronization with the first transition of an image clock, the counter 31 decreases its count in accordance with a count clock transmitted from a count clock generator 32. When the count value is "0", the counter 31 transmits a Carry signal shown in FIG. 5E. The carry signal is supplied to the CLR of a J.K flip-flop 33, and then a signal obtained by pulse width modulation as shown in FIG. 5F is transmitted from an output Q of the J.K flip-flop 33. Then, the signal, the pulse width of which has been modulated, is supplied to a laser driver (omitted from illustration), so that a halftone image is printed by an electrophotography method in which the laser source is turned on/off to expose a photosensitive drum to light. In order to form a 64-gradation image, a clock which is 64 times the image clock in frequency must be used as the counting clock.

However, in such electrophotography, the pulse width and the density of the printed image are not in strict proportion to each other, and the gradient is small in the portions at which the pulse width is small or large, and is small in the intermediate portion. Hence, the density of the half tone image will be formed too roughly with the aforesaid pulse width equally sectioned into 64 portions, and thus the halftone image cannot be formed sufficiently clearly. Another available method in which the frequency of the clock is raised encounters a problem in that the cost cannot be reduced.

Hitherto, the laser beam printer has a laser drive circuit arranged as shown in FIG. 33. Referring to FIG. 33, reference numeral 34 represents a constant current circuit the current value of which can be set in response to a current setting analog signal APC 33 supplied from outside. The supply/cut of the set current to the semiconductor laser 5 is switched by a switch circuit composed of a resistor R80, and transistors Tr80 and Tr81. That is, when the level of image signal VIDEO 32 is low, the electric current flows to the semiconductor laser 5, so that the laser is turned on. When the same is high, the electric current flows between the collector and the emitter of the transistor Tr80 and not to the semiconductor laser.

The laser beam printer uses the laser drive device shown in FIG. 33 to perform, for example, the following printing operation. The laser beam printer has a resolution of 300 dots/inch to draw and print characters and figures with black dots (●) and white dot (○) at positions on a lattice of 300 dot/inch. FIG. 34 illustrates a dot pattern of letter "a".

However, in the resolution of 300 dots/inch according to the aforesaid conventional structure, the interval of the dots is about 85μ. Although, in general, it is said that an image detail of a level of about 20μ can be distinguished by the human eye, the outline of the character or the figure has notches, and thus the quality of the printed image is unsatisfactory.

In order to overcome the aforesaid problem, use of a method in which the resolution is simply raised will cause the frequency of the control clock required for each electric circuit to be raised. Therefore, a special and expensive device must be used, and in addition, the aforesaid high frequency region is a region in which the laser drive apparatus cannot satisfactorily response to the frequencies.

SUMMARY OF THE INVENTION

An object of the present invention is to provide an image processing apparatus capable of overcoming the aforesaid problems experienced with the conventional structures.

According to one aspect of the present invention, there is provided an image processing apparatus in which a plurality of clocks are used to perform a pulse width modulation and a clock is selected in accordance with the density of an image and/or the counted value of the clock.

According to another aspect of the present invention, there is provided an image processing apparatus in which a normal phase and an opposite phase of a count clock are used in a portion in which the density is changed considerably with respect to the pulse width to narrow the pulse width and which is thereby capable of forming clear halftone images in printing.

According to another aspect of the present invention, there is provided an image processing apparatus for performing pulse width modulation in accordance with a supplied multivalue image signal to record a multigradation density image, the image processing apparatus having generating means for generating a plurality of count clocks; count means for counting the count clocks supplied from the generating means; selection means for selecting a desired count clock in accordance with a counted value of the count means and the multivalue image signal and pulse width modulation means for performing a pulse width modulation by using the counted value of the count means and the multivalue image signal.

Furthermore, the generating means generates a first count clock having a frequency higher than the frequency of an image clock, a second count clock the phase of which is realized by reversing the phase of the count clock and a third count clock obtained by dividing the first count clock.

In addition, the selection means receives the count value and the multivalue image signal as address information to transmit a selection signal for selecting a desired count clock.

In the aforesaid structure, a desired count clock is selected from among the generated count clocks in accordance with the counted value of the count clocks and the multivalue image signal, the pulse width modulation is performed in accordance with the counted value obtained in accordance with the selected count clock and the multivalue image signal and a multigradation image is recorded, so that the pulse width can be narrowed and clear halftone image can be formed in printing.

According to another aspect of the present invention, there is provided an image processing apparatus or its drive circuit in which plural levels of light quantities are used in a halftone process such as a smoothing process or a dither process to improve the gradation characteristics.

Other and further objects, features and advantages of the invention will appear more fully from the following description.

BRIEF DESCRIPTION OF THE DRAWINGS

FIGS. 5A through 5F are timing charts which illustrate the timing of each signal according to the conventional example;

FIG. 9 illustrates the processing circuit according to a third embodiment of the present invention;

FIGS. 10A to 10E illustrate dither processing according to the third embodiment of the present invention;

FIG. 12 illustrates a processing circuit according to a fourth embodiment of the present invention;

FIG. 18 illustrates a beam output;

FIG. 20 illustrates a processing circuit according to a fifth embodiment of the present invention;

FIGS. 25A to 25L are timing charts which illustrate a light quantity control operation according to the seventh embodiment of the present invention;

FIG. 27 is a flow chart which illustrates the light quantity control operation according to the seventh embodiment of the present invention;

FIG. 29 illustrates a smoothing process according to the seventh embodiment of the present invention;

FIG. 30 illustrates an example of a result of the smoothing operation according to the seventh embodiment of the present invention;

DESCRIPTION OF THE PREFERRED EMBODIMENTS

The preferred embodiments of the present invention will now be described with reference to the drawings.

Figure 1:
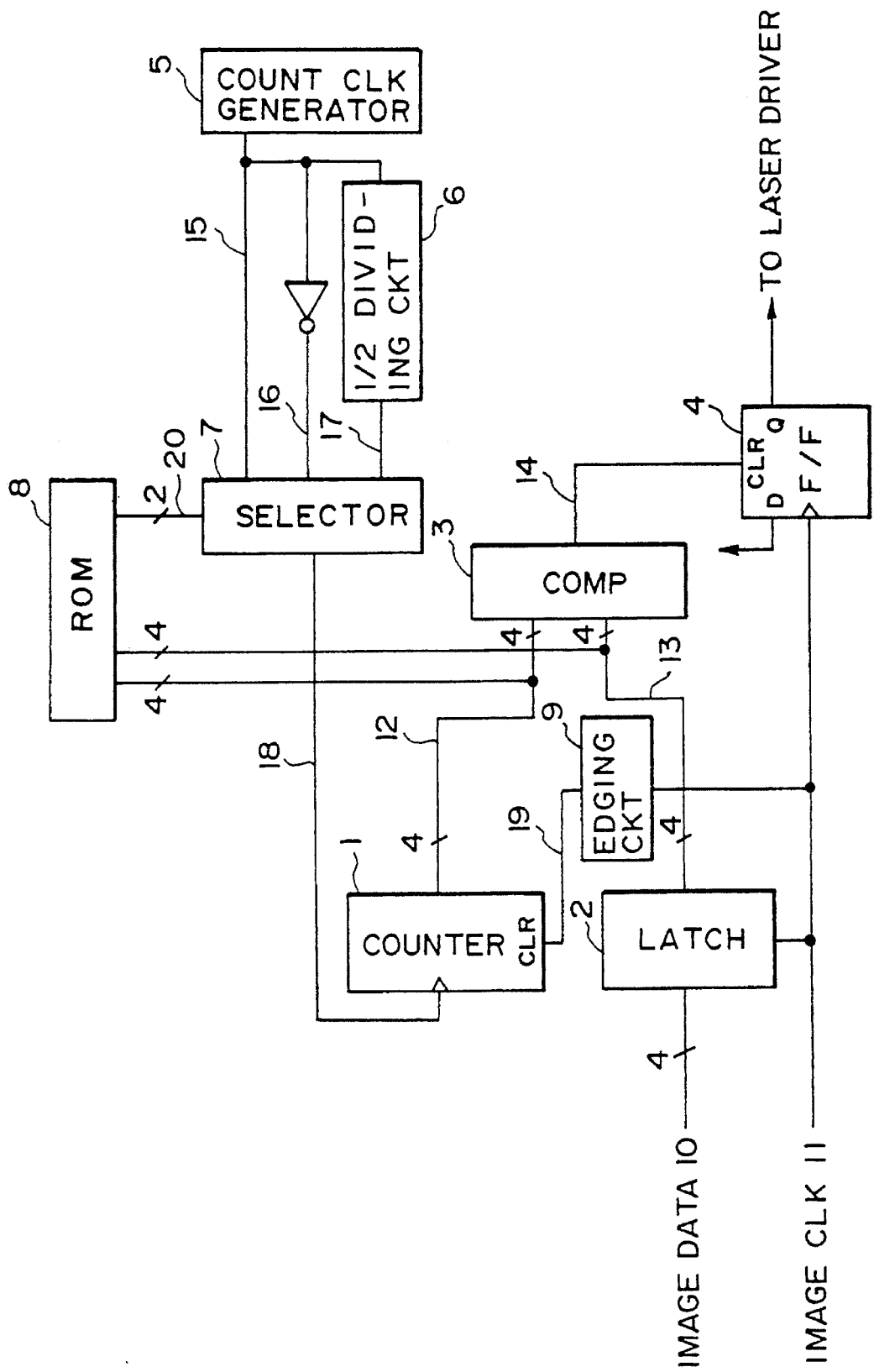
FIG. 1 is a block diagram which illustrates a signal processing portion of a recording apparatus according to a first embodiment of the present invention.

FIG. 1 is a block diagram which illustrates a signal processing portion of a recording apparatus according to a first embodiment of the present invention. As shown in FIG. 1, 4-bit multivalue image data 10 supplied in synchronization with an image clock 11 is latched by a latch 2 before it is transmitted to a comparator 3. An edging circuit 9 detects the first transition edge of the image clock 11 and transmits a clear signal 19 for clearing a counter 1. The counter 1 counts the count value (4 bits) by means of a clock signal 18 transmitted from a selector 7 to be described later. An output value 12 of the counter 1 is supplied to a comparator 3. The comparator 3 makes a comparison between the count output value 12 and an image data output value 13 (4 bits) from a latch 4. If they coincide with each other, the comparator 3 transmits a clear signal 14 for a flip-flop 4. The flip-flop 4 transmits an "H" signal at the first transition of the image clock 11 and the level of it is lowered in response to the clear signal 14. Thus, the pulse width which corresponds to the image data 10 is transmitted to a laser driver (omitted from illustration) in one period of the image clock 11.

A ROM 8 stores data which corresponds to the relationship between the pulse width and the density and receives, as an address, the output value 12 from the counter 1 and the image data output value 13 from the latch 2 and data about the address is, as a selection signal 20, transmitted to the selector 7. The selector 7 receives an output signal 15 from a count clock generating unit 5, its opposite-phase signal 16 and a ½ dividing signal 17 of the output signal 15 for the purpose of selecting any one the aforesaid signals in response to the selection signal 20 supplied from the ROM 8, the selected signal being then transmitted to the aforesaid counter 1. The count clock generating unit 5 transmits a clock 15 which is 24 times the image clock, that is 16 times the frequency (let it be f).

Then, the specific operation of the thus constituted signal processing portion will now be described.

Figure 3:
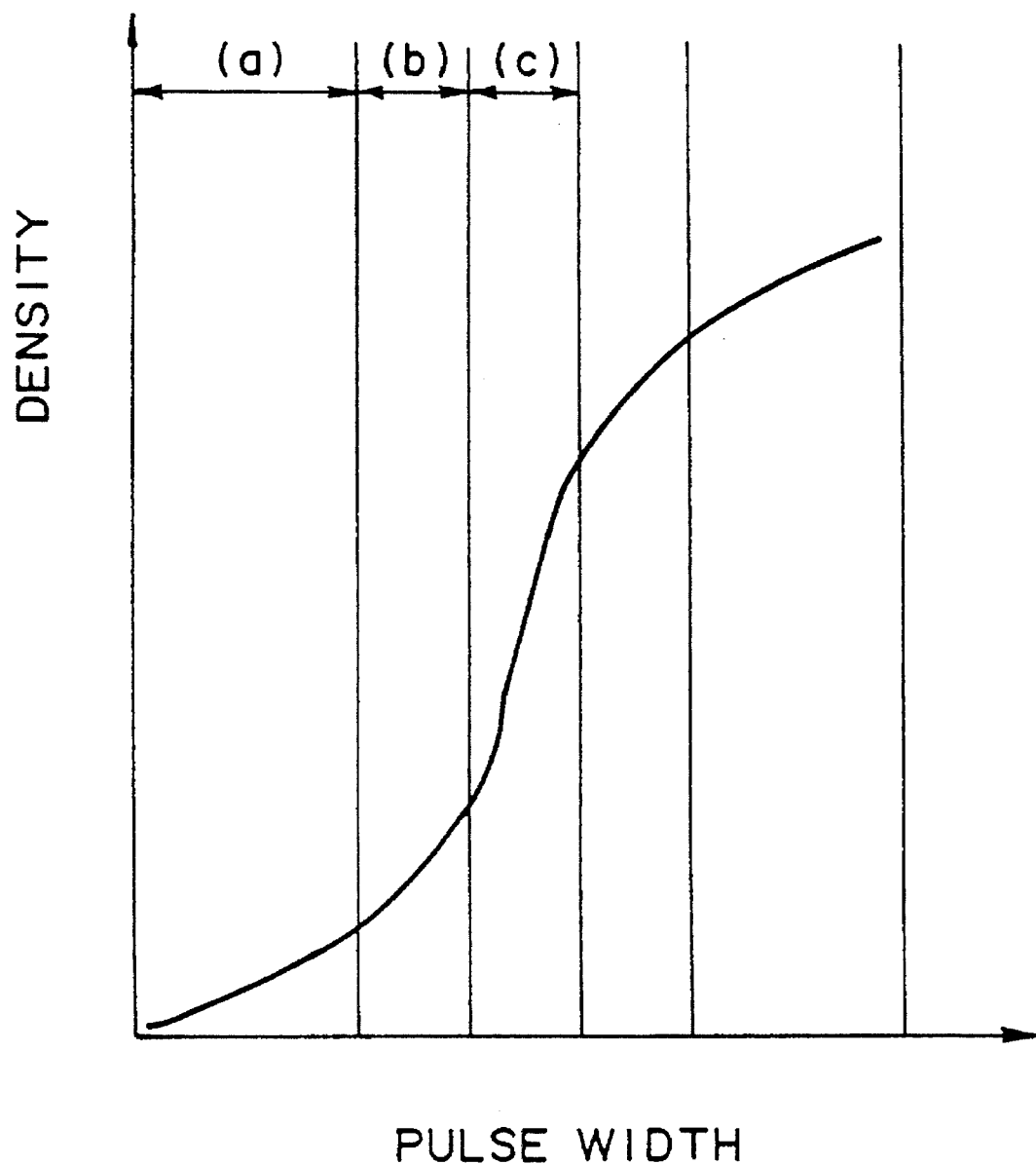
FIG. 3 is a graph which illustrates the relationship between the density and the pulse width.
Figure 4:
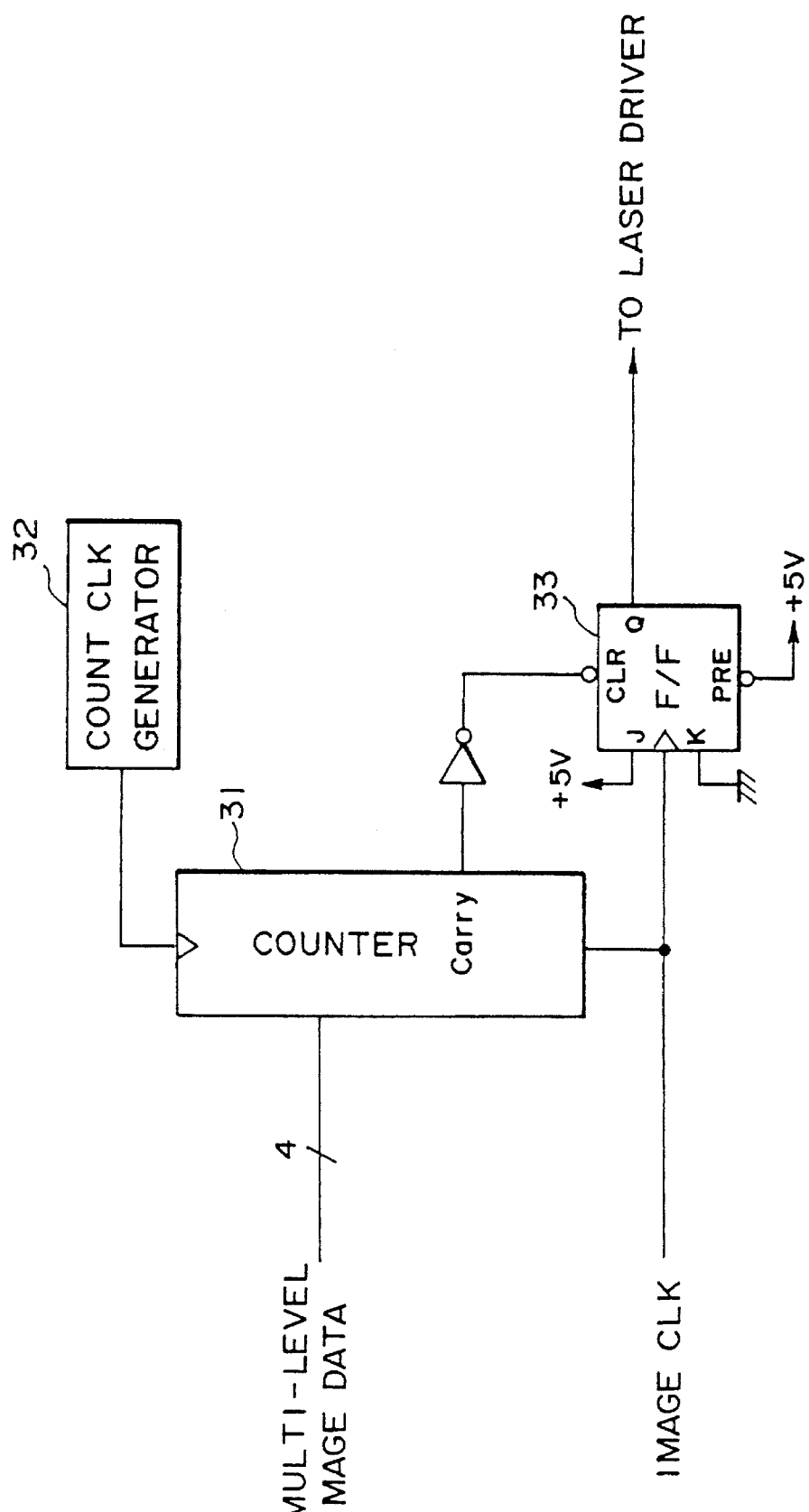
FIG. 4 is a block diagram which illustrates a signal processing portion of a recording apparatus according to a conventional example.
Figure 6:
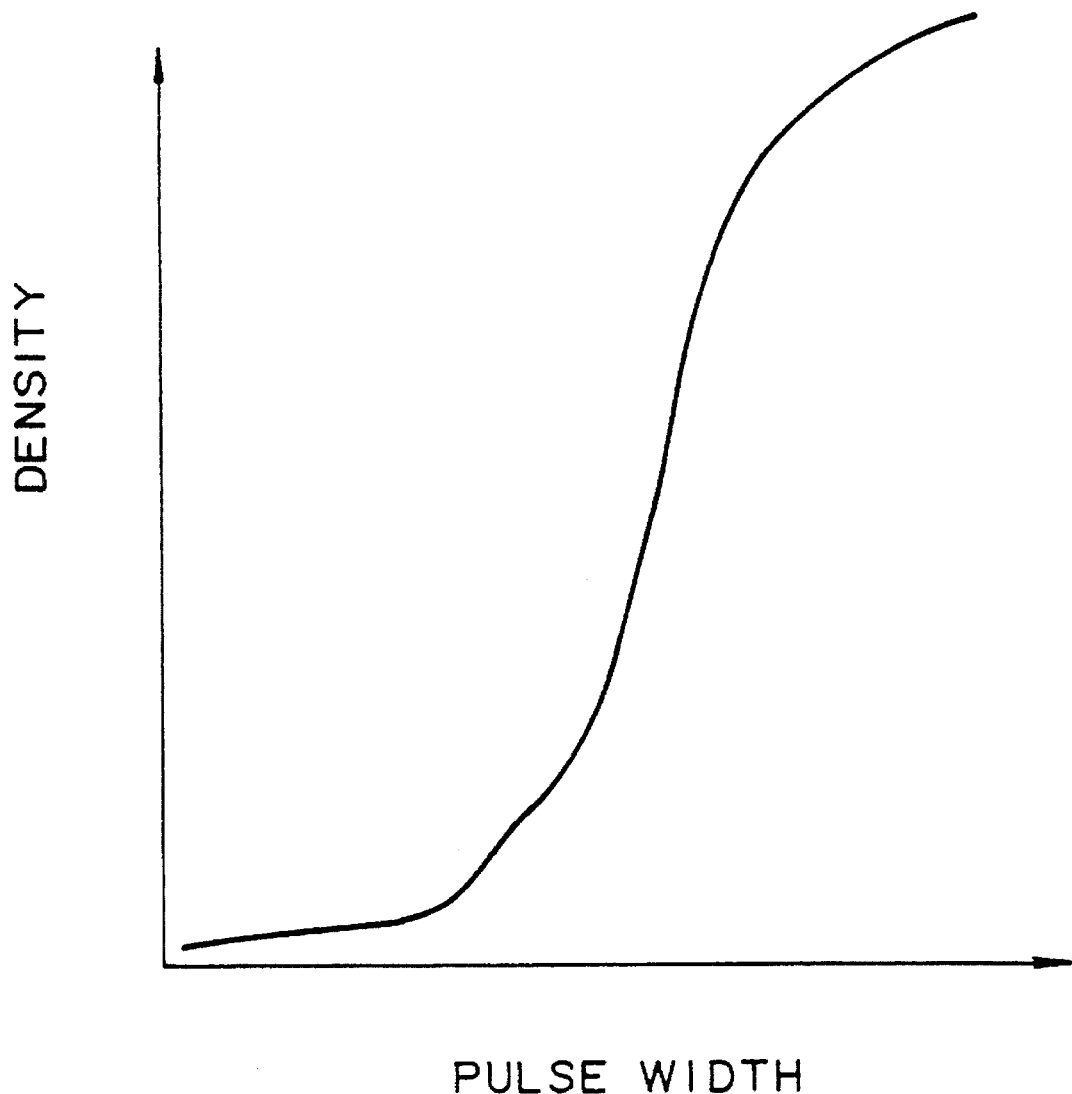
FIG. 6 is a graph which illustrates the relationship between the density and the pulse width.

An assumption is made here that the ROM 8 previously stores the characteristics of a printer structured as shown in FIG. 3.

Figure 2A:
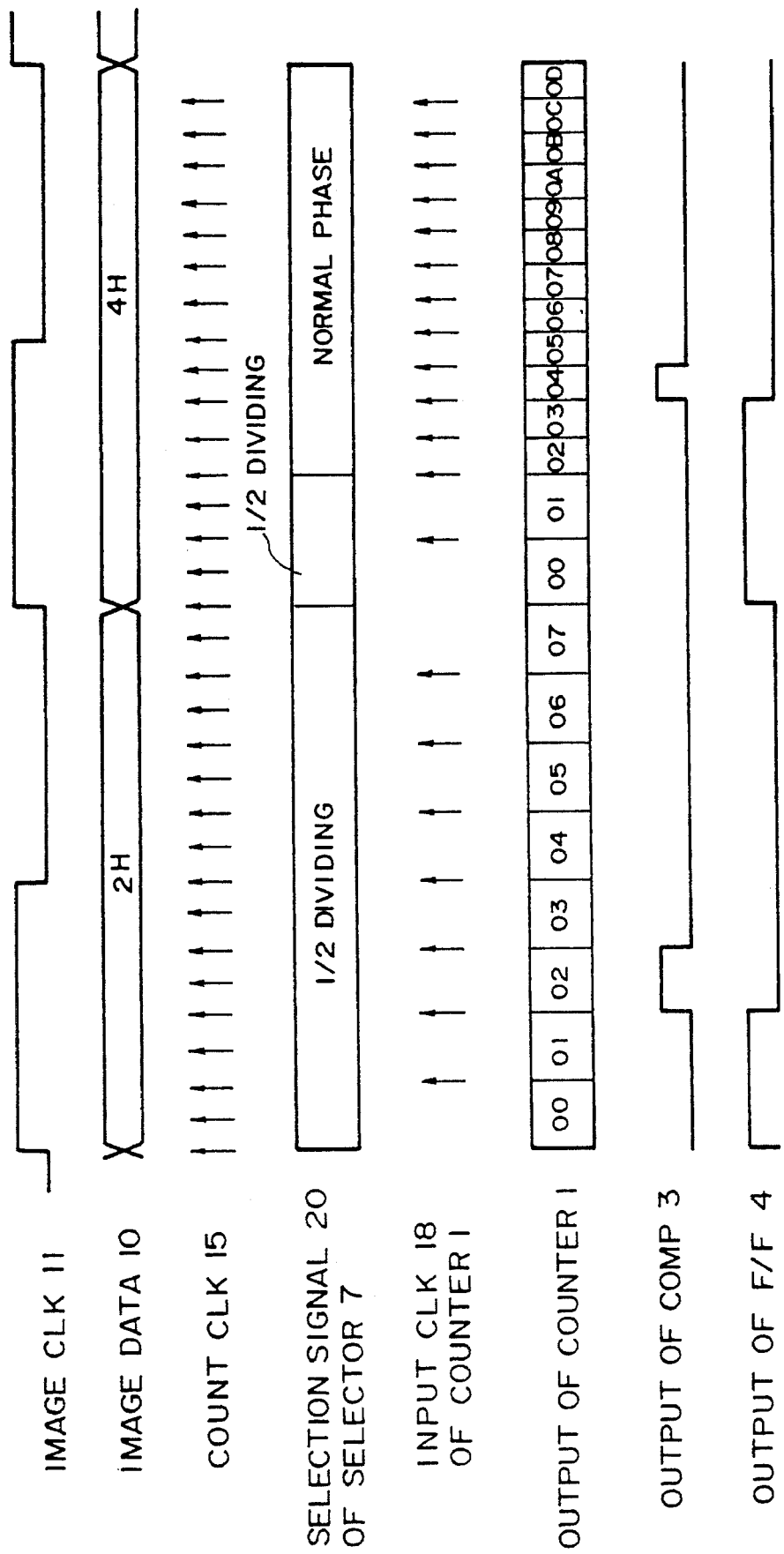
FIGS. 2A and 2B are timing charts which illustrate the timing of each signal according to the first embodiment of the present invention.

First, if the supplied image data 10 is a low density "1H" or "2H", the ROM 8 transmits the selection signal 20 for selecting the signal 17 obtained by halving the clock 15 to the selector 7 in order to transmit a pulse width which corresponds to portion (a) shown in FIG. 3. The selector 7 selects the signal 17, that is a clock the frequency of which is ½ of the count clock 15, so that the count of the counter 1 is increased by ½f. The aforesaid operation is shown in FIG. 2A. In the example shown in FIG. 2A, the image data 10 is "2H" and therefore a signal the width of which is ¼ of that of the image clock is transmitted from the flip-flop 4.

The ROM 8 is structured to stop the supply of the clock to the counter 1 when the output from the counter 1 is the maximum value.

In a case where the image data 10 is "3H" or "4H", the pulse width corresponding to portion (b) shown in FIG. 3 must be transmitted. Therefore the ROM 8 transmits the selection signal 20 for selecting the signal 17. When the output value 12 from the counter 1 is made to be "2H", the ROM 8 transmits the selection signal for selecting the signal 15 (normal phase). As described above, the selection signal 20 is switched from the ½ division to the normal phase by the output value 12 from the counter 1. Thus, the count of the counter 1 is increased at (½)f and then the same is increase at f. That is, in a case where the image data 10 is "4H" as shown in FIG. 2A, a signal the width of which is ⅜ of the image clock is transmitted.

Figure 2B:
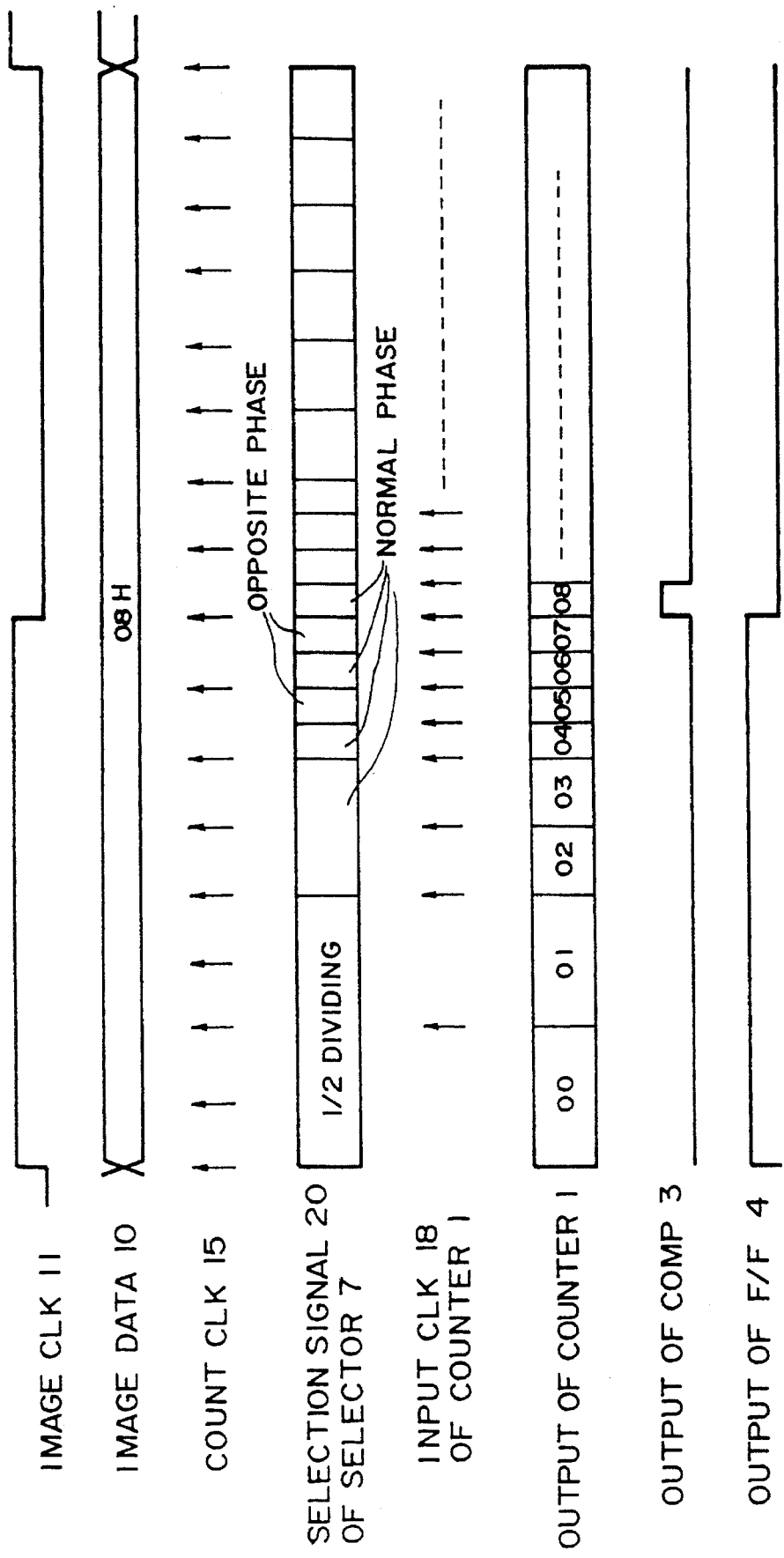

In a case where the image data 10 is "5H" to "BH", the pulse width which corresponds to portion (c) shown in FIG. 3 must be transmitted. Therefore, the count of the counter 1 is increased at (½) to "2H" and is increased at f to "4H". When the image data 10 exceeds "4H", the selector 7 alternately selects the signals 15 and 16 (opposite phase) whenever the count of the counter 1 is increased, so that the count of the counter 1 is increased at 2f. FIG. 2B illustrates a case where the image data 10 is "8H". In this case, the normal phase and the opposite phase are alternately selected when the output value 12 of the counter 1 is "5H" or higher, so that a signal the width of which is ½ of the image clock is transmitted. As described above, the normal and the opposite phases are used and the clock is doubled in a portion in which the gradient of the density-pulse width curve is steep to section the pulse width. As a result, a clear half tone image can be expressed.

As described above, according to the first embodiment, the normal and the opposite phases of the reference clock are used, so that a further clear half tone image can be expressed.

Then, a second embodiment of the present invention will now be described with reference to the drawings.

Figure 7:
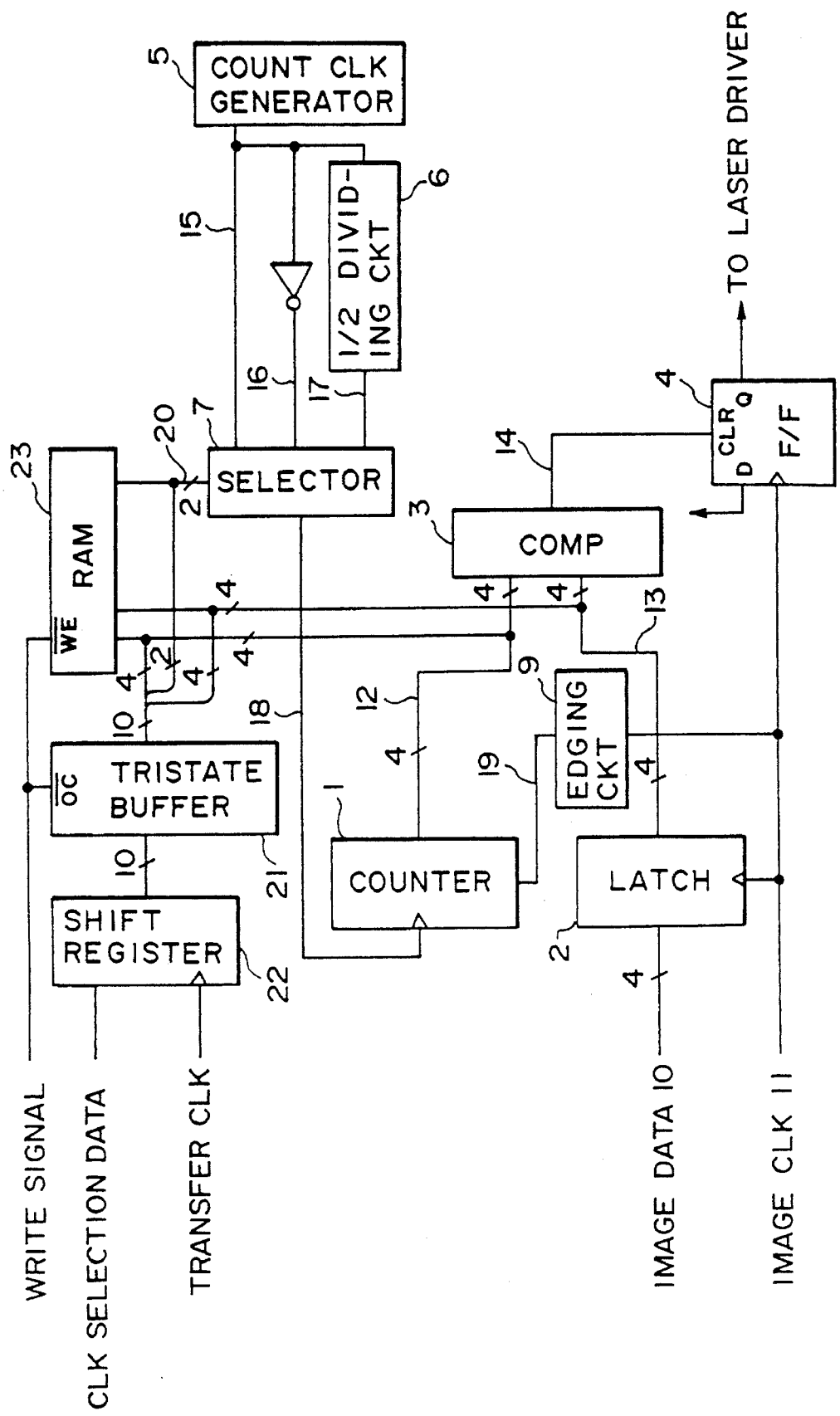
FIG. 7 is a block diagram which illustrates a signal processing portion of the recording apparatus according to a second embodiment of the present invention.

FIG. 7 is a block diagram which illustrates a signal processing portion of the recording apparatus according to the second embodiment of the present invention. Although the ROM 8 stores data corresponding to the characteristics of the printer in the aforesaid embodiment, a RAM is employed, so that data can be reloaded.

Figure 8:
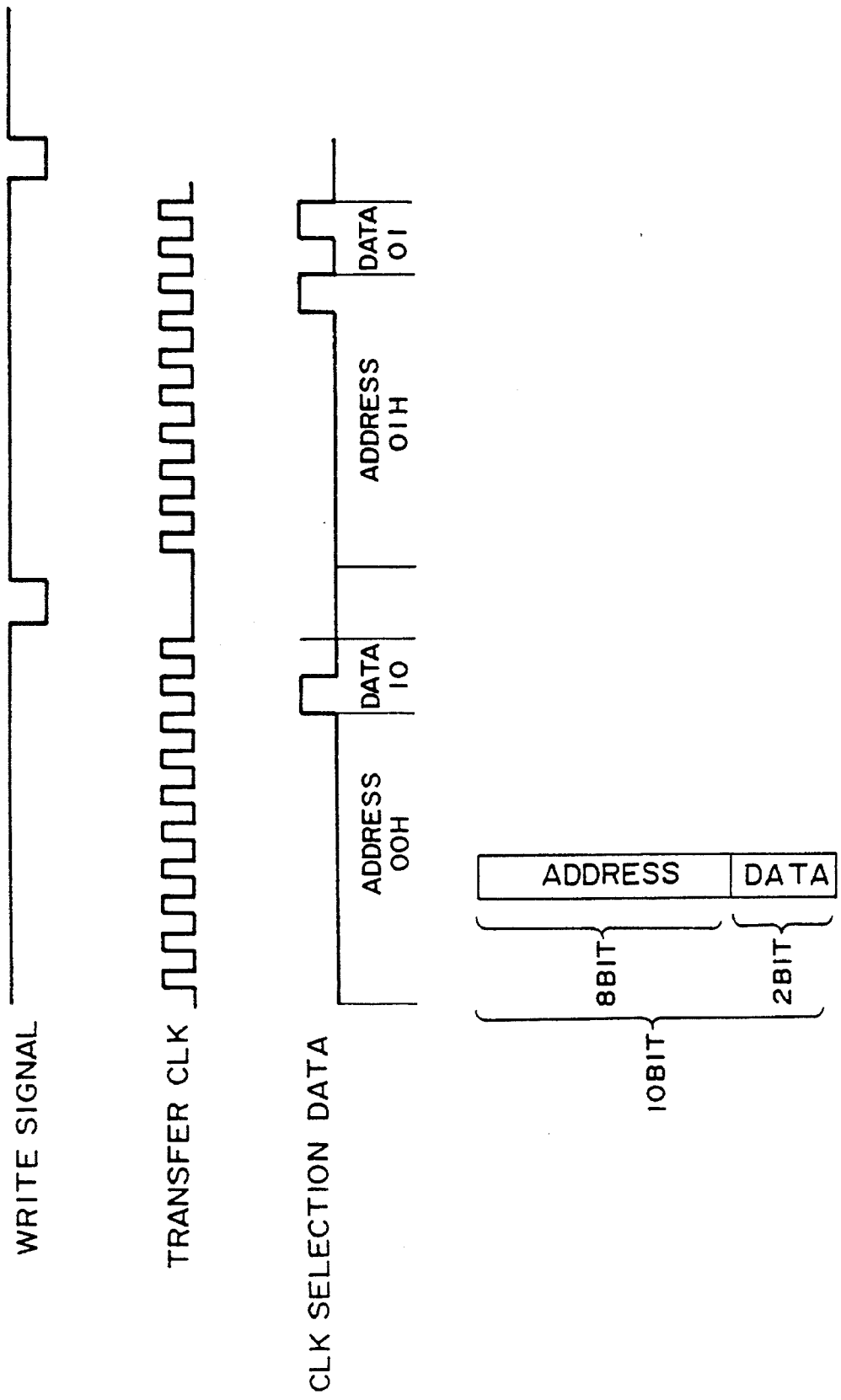
FIG. 8 illustrates the structure of data and timing.

Referring to FIG. 7, data transmitted from external equipment (omitted from illustration) is, as shown in FIG. 8, formed by 10 bits composed of address (8 bits) and data (2 bits) and is converted from a series state to a parallel state by a 10-bit shift register 22 in response to a transference clock. A write signal is made to be True at timing following the supply of 10 transference clocks before data is transmitted from a tristate buffer 21 so as to be written to a RAM 23. After all of data items have been written to the RAM 23, the image processing operation according to the aforesaid embodiment is commenced.

As described above, data to be written to the RAM 23 can be changed in accordance with, for example, the temperature or the humidity or the like of the printer, so that printing corresponding to the change of the environment can be performed.

As described above, according to the first and second embodiments, the normal phase and the opposite phase of the count clock are used in a portion in which the density is considerably changed with respect to the pulse width. As a result, the pulse width can be thinned, so that a halftone image can be clearly printed.

Although the clock can be selected from a group consisting of the normal phase, the opposite phase and the ½ divided clocks in the aforesaid embodiments, it may be selected from a plurality of clocks having different phases or clocks having different frequencies.

Figure 14:
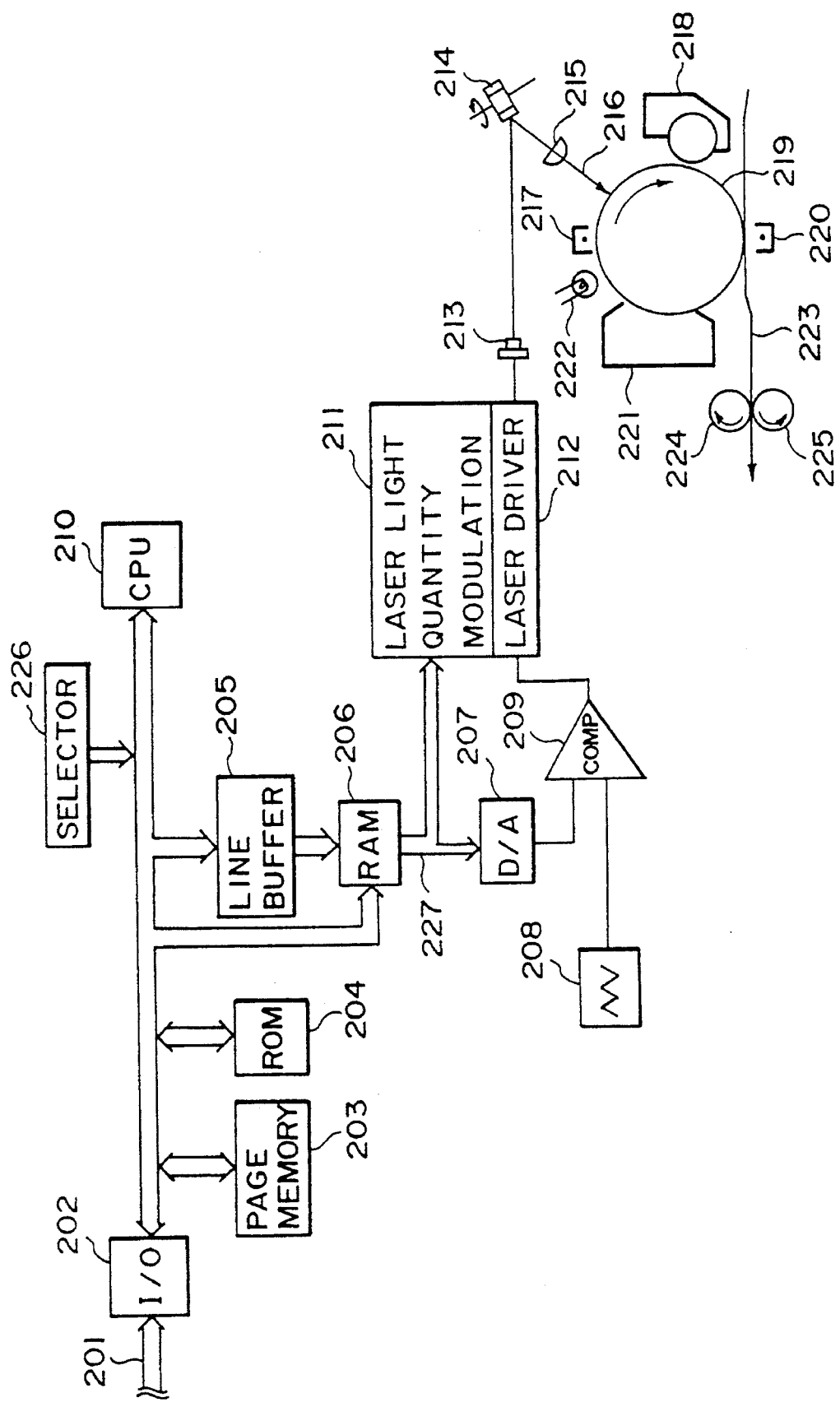
FIG. 14 is a block diagram which illustrates the process according to a related art approach.

FIG. 14 is a block diagram which illustrates an image processing apparatus for transmitting an image by modulating time in which a laser is turned on and the quantity of light. An 8-bit multivalue digital image data 201 transmitted from a host computer or the like (omitted from illustration) is stored in a page memory 203 through an I/O port 202. The thus stored 8-bit data is read by a line buffer 205 and then it is subjected to a digital-to-digital conversion by a RAM 206 which is used as a lookup table.

Figure 15:
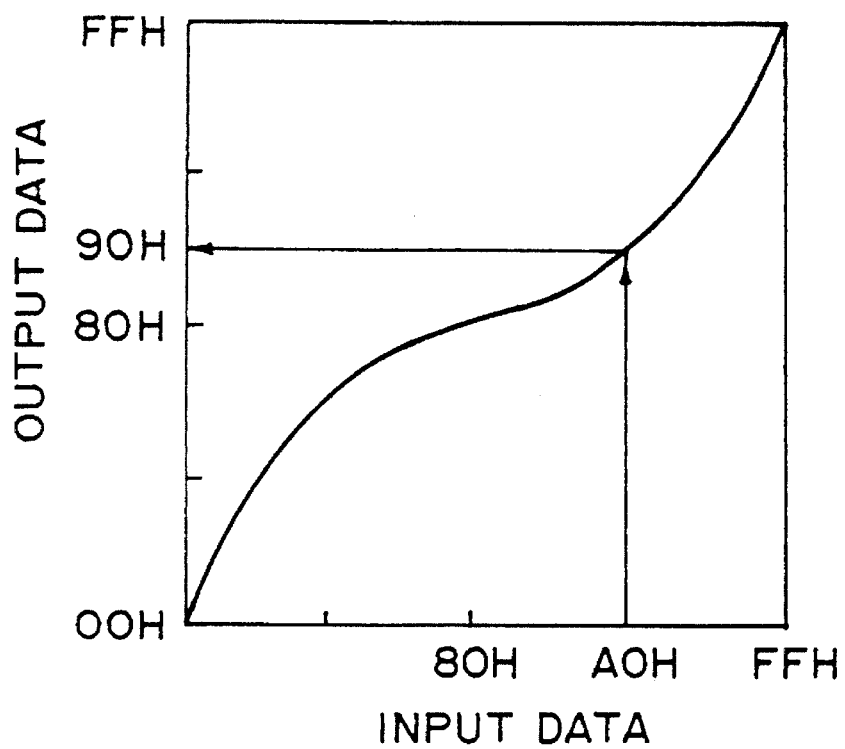
FIG. 15 illustrates a digital conversion characteristic.

FIG. 15 illustrates an example of the contents of the lookup table in the RAM 206. When, for example, AOH is, in the form of a hexadecimal expression, supplied as density data of the image, data converted into 90H is transmitted. Referring to FIG. 14, reference numeral 226 represents a selector which controls loading of information from a CPU 210 in the lookup table 206 before printing is performed.

Figure 16:
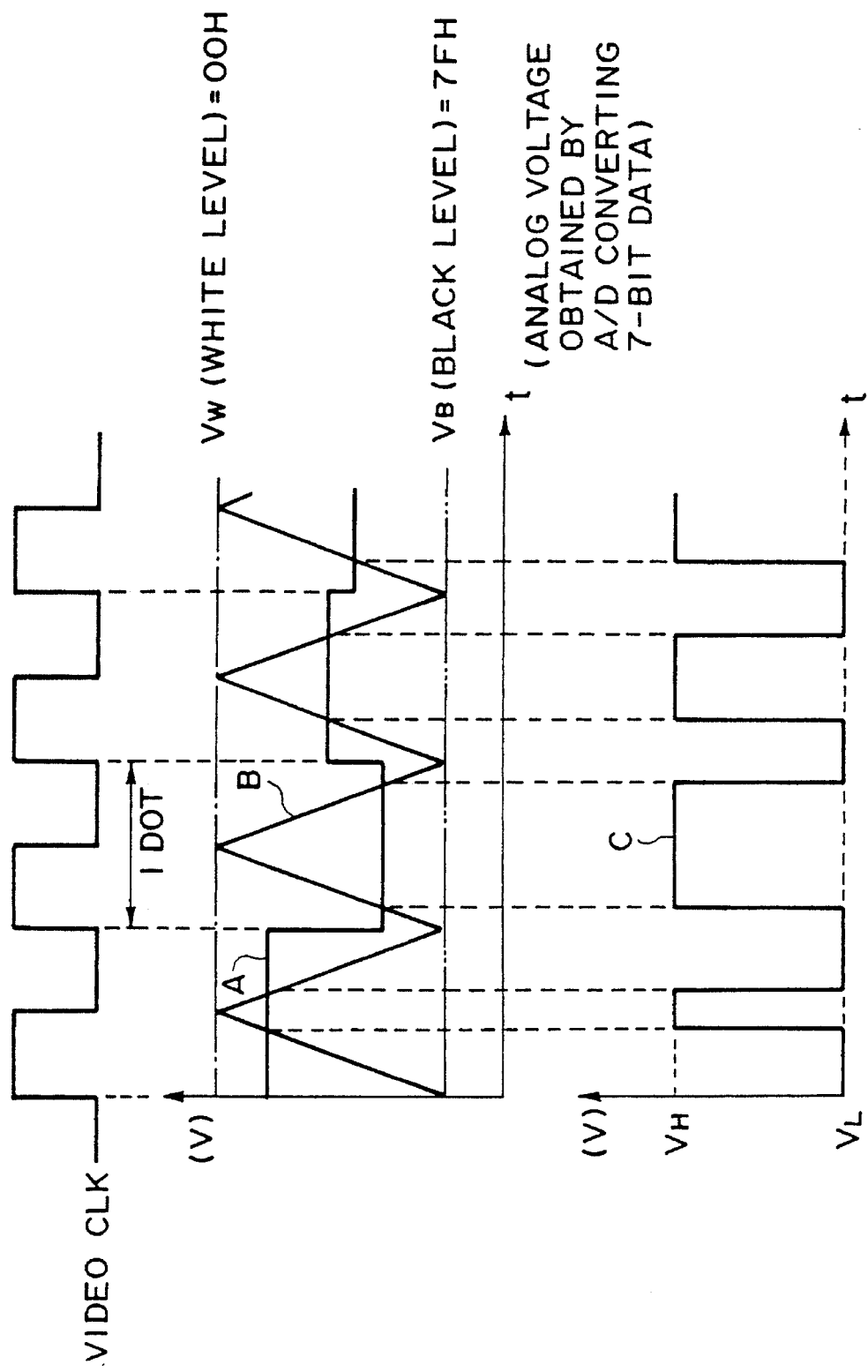
FIG. 16 illustrates pulse width conversion.

8-bit gradation data corrected by the lookup table RAM 206 is subjected to a process in which its upper 7 bits are converted into an analog signal of 0 to 128-level by a D/A converter 207. The aforesaid analog signal is subjected to a comparison with triangle wave transmitted from a triangle wave generating unit 208 so as to be pulse-width modulated. The aforesaid state will now be described with reference to FIG. 16. Referring to FIG. 16, symbol A represents an output from a D/A converter. In response to the pulse width modulation signal, the laser driver 212 is driven. The laser driver turns on a laser 213 when the pulse width modulation signal is $V_L$ to irradiate a photosensitive drum 219. As a result, printing is performed by electrophotography.

Figure 17:
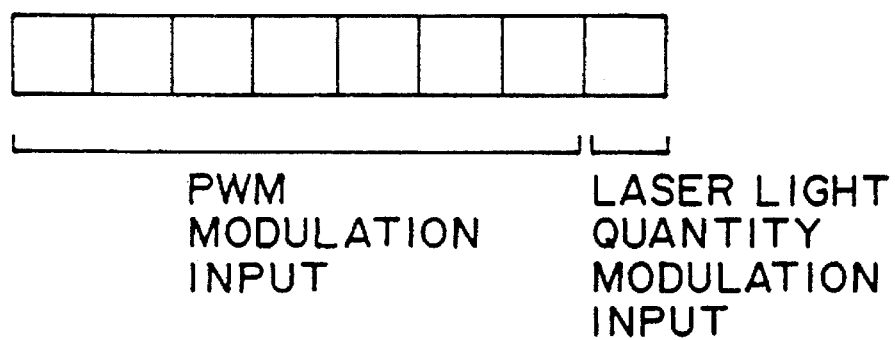
FIG. 17 illustrates a digital output bit.

FIG. 17 illustrates the contents of the 8 bits transmitted from the RAM 206. As described above, a state in which the upper 7 bits are used as a PWM (Pulse Width Modulation) input, while the lower 1 bit is used as a laser light quantity modulation input, that is the time in which the laser 213 is turned on is controlled in response to the PWM signal transmitted from the comparator 209. Furthermore, the light quantity at the time of turning on is controlled by a laser light quantity modulation input. For example, when the laser light quantity modulation signal is "L", the light quantity is strong. When the laser light quantity modulation signal is "H", the light quantity is weak.

FIG. 18 illustrates the laser output light quantity with respect to the PWM signal and a 1-bit light quantity modulation input.

As described above, the density interpolation is performed by controlling the time in which the laser is turned on and the light quantity, so that an image revealing excellent gradation is transmitted.

However, since the two-level light quantity is modulated every one period of a video clock, that is, every pixel, the number of the gradations is unsatisfactorily doubled as compared with the case of only the pulse width modulation. Furthermore, the number of the gradations is further unsatisfactorily small when the change in the density due the environment is taken into consideration.

The following embodiment has gradation processing means for performing a record intensity modulation in accordance with multivalue data to raise the output clock of the gradation processing means with respect to the input clock, so that the light quantity modulation is enabled in one pixel.

By performing the intensity modulation in one pixel, the number of the gradations can be increased.

FIG. 9 illustrates a third embodiment of the image processing apparatus. Referring to FIG. 9, reference numeral 1 represents a latch, 2 represents an oscillator for generating clock 4f (having a frequency which is four times that of image clock f) of a predetermined period for expressing the density in the main scanning direction of the printer apparatus. The oscillator is a synchronizing oscillator which is operated in synchronization with host side video clock VCLK (7). The synchronizing oscillator 2 transmits density clock 4f the frequency of which is four times the clock VCLK assuming that the frequency of clock VCLK is f. Reference numeral 3 represents a main scanning counter which receives the clock 4f of the synchronizing oscillator 2 to increase its count. Reference numeral 4 represents a sub-scanning counter for increasing its count in accordance with the number of the horizontal synchronizing signal HSYNC (8). Reference numeral 5 represents a table memory for receiving multivalue input image data and output values of the counters 3 and 4 as address and for transmitting "1" or "0" which is the result of a process in which multivalue input image data is dither-processed by a predetermined area modulation threshold matrix. Reference numeral 105 represents a table memory for receiving multivalue input image data and output values of the counters 3 and 4 as address and for transmitting "1" or "0" which is the result of a process in which multivalue input image data is dither-processed by a predetermined area modulation threshold matrix. Reference numeral 6a represents a video data input terminal for receiving multivalue image data VIDEO (6). Reference numeral 7a represents an input terminal for receiving video clock VCLK (7). Reference numeral 8a represents an input terminal for receiving horizontal synchronizing signal HSYNC (8). Reference numeral 9a represents an input terminal for receiving vertical synchronizing signal VSYNC (9). Reference numeral 10 represents a binary signal transmitted from the table memory 5, that is dither processed image data VDO. The dither-processed binary signal VDO serves as a modulation signal for turning on/off the laser. Reference numeral 110 represents a binary signal transmitted from the table memory 105, that is light quantity modulation data LP which has been dither-processed for the purpose of modulating the light quantity. The binary signal LP which has been dither-processed for modulating the light quantity serves as a laser light quantity modulation signal to strengthen/weaken the laser light quantity when the laser is turned on.

The operation of the circut shown in FIG. 9 will now be described.

The 6-bit multivalue image data VIDEO (6) supplied from host equipment such as a reader or a host computer or the like is latched by the latch circuit 1 in response to the video clock VCLK (7) of a predetermined period and similarly supplied from the host equipment. The latched multivalue image data 6 is supplied as an address signal for the table memory 5 and the table memory 105.

The video clock 7 triggers the synchronizing oscillator 2 and the output from the synchronizing oscillator 2 increases the count of the main scanning counter 3. The main scanning counter 3 expresses its count value with parallel binary 4-bits, the 4-bit data being then supplied to the upper bit of the table memory 5 and the table memory 105 to which the multi-value image data 6 is supplied. The main scanning counter 3 is reset in response to the horizontal synchronizing signal HSYNC (8) to act as pointer address obtained by sectioning (1 dot region of 1200 dpi) the pixel region.

The count of the sub-scanning counter 4 is increased in response to the horizontal synchronizing signal HSYNC (8) and is expressed by parallel binary 4 bits. The 4-bit data is supplied to the upper bit of the table memory 5 and the table memory 105 to which the count value of the counter 3 is supplied. The sub-scanning counter 4 is reset at the leading portion of the image region in response to the vertical synchronizing signal VSYNC (9) so as to act as a pointer in the sub-scanning direction.

Then, a halftone image processing method will now be described which is employed in a printer in which the main scanning density is higher than the transference rate (assumed to be 300 dpi) of the input image data.

FIGS. 10A to 10E ilustrate the way of programming the table memory 5 for executing the dither process for the area modulation.

Figure 10A:
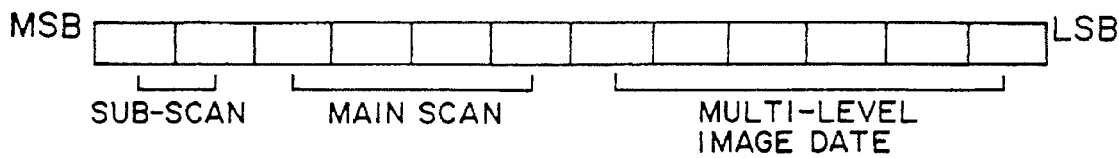
Figure 10B:
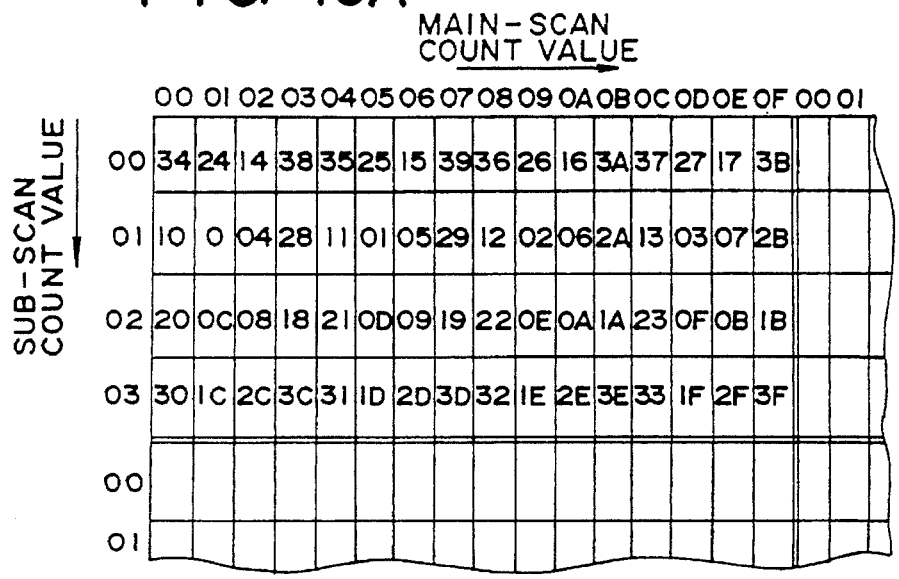
Figure 10D:
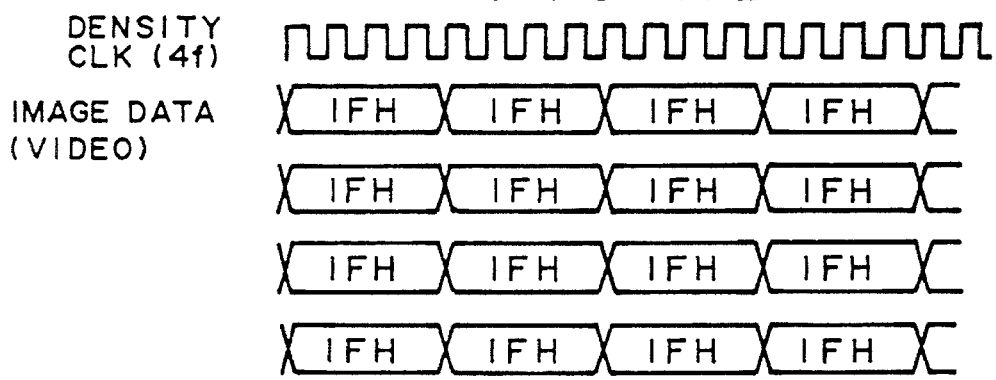

As described above, the memory address is, as shown in FIG. 10A, composed of the upper 2 bits for the count value of the sub-scanning counter 4, the lower bits for the count value of the main scanning counter 3 and the lowermost 6 bits for the multivalue image data VIDEO. FIG. 10B illustrates the dither matrix according to this embodiment. Referring to FIG. 10B, numerals denote thresholds for use in the binary operation. Usually, each threshold is sequentially accessed by the count value of the sub-scanning counter 4 and the main scanning counter 3 so as to be subjected to comparisons with multivalue image data. According to this embodiment, data "1" or "0" obtained by a dither process performed by using the dither matrix shown in FIG. 10D is previosly stored in the table memory 5 as shown in FIG. 10C.

The count values of the sub-scanning counter 4, the main scanning counter 3 and multivalue data are directly supplied to the table memory 5 as the address. Then, only binary data "1" or "0" is taken from the table memory 5.

In the following description, an assumption is made for the purpose of simplifying the description that the sub-scanning counter 4 and the main scanning counter 3 sequentially access each threshold.

The sub-scanning counter 4 acts as a pointer address to be operated in the direction of the row of the dither threshold value shown in FIG. 10B whenever the horizontal synchronizing signal HSYNC is supplied. The main scanning counter 3 which is lower than the sub-scanning counter 4 receives the density clock 4f generated by the synchronizing oscillator 2 to act as an address pointer in the direction of the column every clock.

When the vertical synchronizing signal VSYNC is supplied from the host equipment at the time of receiving image data, the sub-scanning counter 4 is reset to address row "00H" shown in FIG. 10B.

Then, the main scanning counter 3 is reset in response to the horizontal synchronizing signal HSYNC to address column "00H". The threshold accessed at this time is "34H". Therefore, when the value of input multivalue image data is "34H", a memory address the lower 6 bits of which is "34H" and all of the upper 6 bits of which are "0" is addressed, the upper 6 bits being the pointer address. Therefore, the multivalue image data VIDEO having a value larger than "34H", assuming that "34H" at 0-row and 0-column is the threshold, can be made to be "1" (the laser is turned on with the weak light quantity or strong light quantity) by making output data from the memory address "0034H" to "00FFH" to be "1" as shown in FIG. 10C. When the density clock 4f is supplied by one pulse, the count of the main scanning counter 3 is increased to point-address "00" row and "01" column. Since the threshold of "00" row and "01" column is "24H", address "0124H" is addressed by the memory address when the value of the input multivalue image data is "24H". Therefore, by making output data from address "0124H" to address "01FFH" to be "1", black dots are always output in a case where input image data is "24H" or more. The aforesaid black dot is discriminated to be a low density black dot or a high density black dot in response to the laser light quantity modulation signal transmitted from the table memory 105 to be described later and acting to modulate the light quantity.

Similarly, also the sub-scanning directional row-switching operation is performed in synchronization with the horizontal synchronizing signal HSYNC formed in response to a laser scanning position detection signal for the printer, so that the table of the memory 5 is switched.

With the aforesaid programming method, the dither threshold value matrix for the area modulation can arbitrarily be programmed. In this case, the most suitable dither matrix may be selected to suit the characteristics of the subject printer.

Figure 10E:
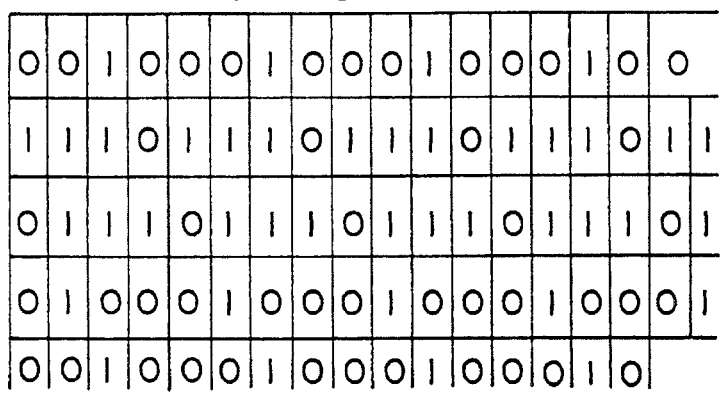

FIG. 10D illustrates the timing of the density clock 4f and that of the image density data VIDEO supplied from the host equipment. FIG. 10E illustrates, by a dot image, image data VDO which has been dither-processed for the area modulation assuming that the value of image data is "1F (H)", that is 1F (H)/3F (H).

Figure 11:
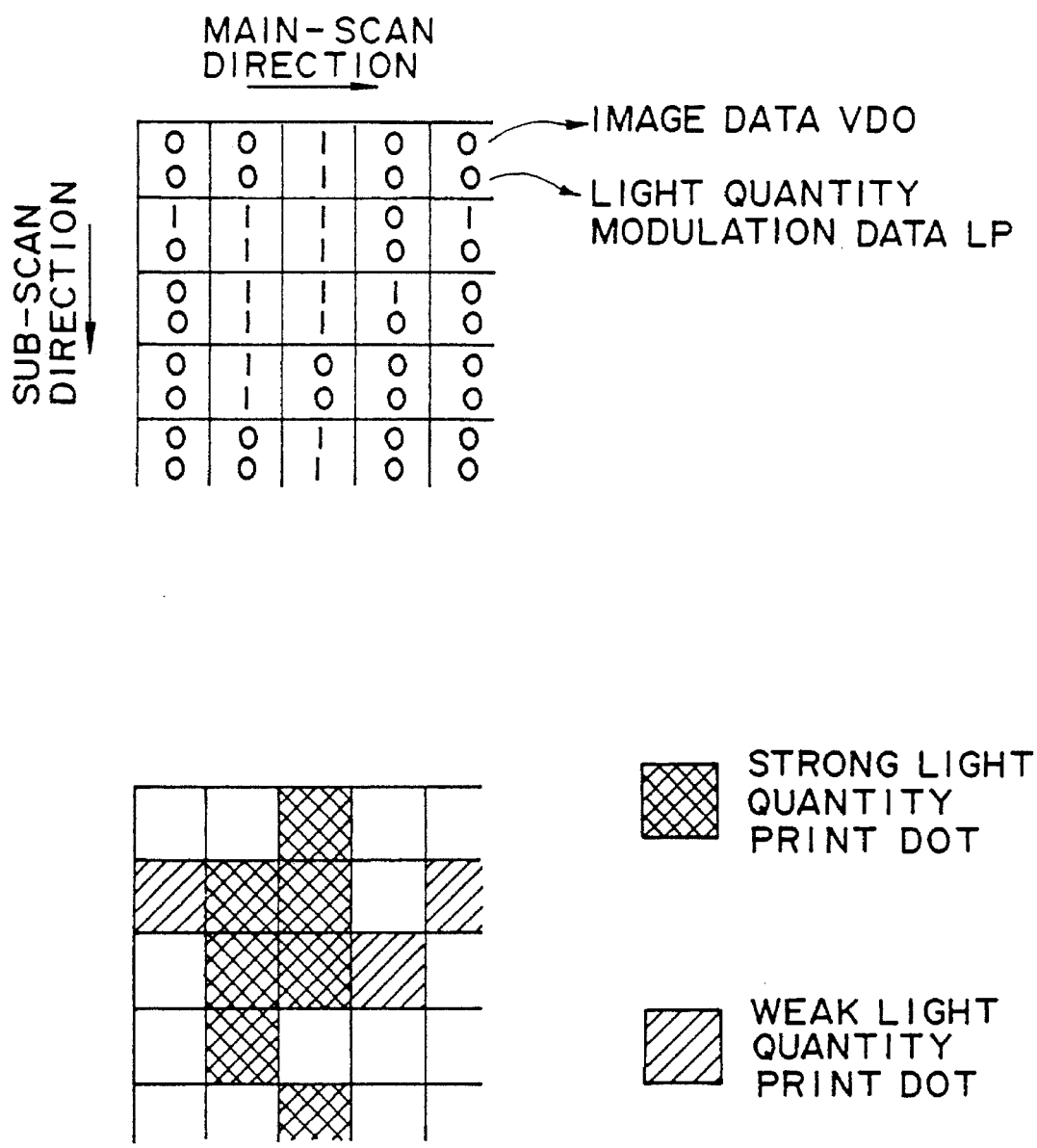
FIG. 11 illustrates an output from a gradation processing according to the third embodiment of the present invention.

FIG. 11 illustrates an example of image data VDO which has been dither-processed for the area modulation, light quantity modulation data LP which has been dither-processed for the light quantity modulation and a state of a printed image. As described above, the area modulation dither process and the light quantity modulation dither process are combined by the matrix 4-row×16-column and the laser light quantities of strong and weak levels are used, so that the following number of gradations can be expressed and an image exhibiting excellent gradation can be printed:

$$\sum_{n=0}^{63} (n+1) = 2080$$

Although the RAM for the lookup table for the area modulation and that for the light quantity modulation are respectively provided in this embodiment, a common RAM may be used from which 2 bits are taken for use as image data for the area modulation and for light quantity modulation data for the light quantity modulation, respectively.

As described above, processed image data is transmitted from the tables memories 5 and 105 with a clock which is four times the image data input clock to the table memories 5 and 105.

A fourth embodiment of the present invention will now be described with reference to FIGS. 12 and 13.

By using the image processing apparatus shown in FIG. 12, an output equivalent to that from the apparatus shown in FIG. 9 can be obtained.

Figure 13:
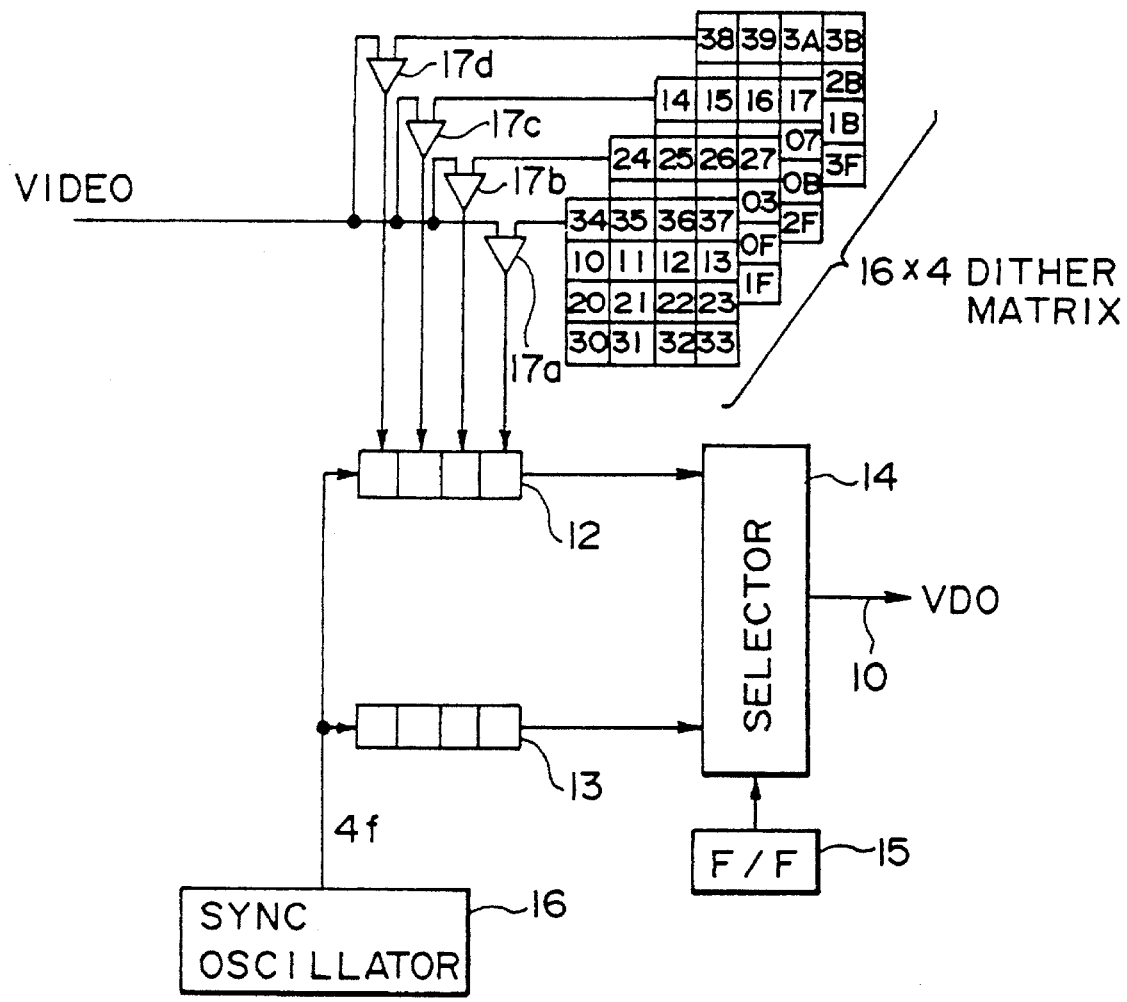
FIG. 13 illustrates a processing circuit according to a fourth embodiment of the present invention.

Referring to FIGS. 12 and 13, elements having the same functions as those of the elements shown in FIG. 9 are given the same reference numerals and their descriptions are omitted here. FIG. 13 is a schematic view which illustrates the operation of the structure shown in FIG. 12.

Referring to FIGS. 12 and 13, reference numeral 11 represents a data line for transmitting data supplied from the table memory 5 which performs the area modulation dither process. Reference numerals 12 and 13 represent parallel input and serial output shift registers for receiving data supplied from the table memory 5. Reference numeral 14 represents a selector for switching a shift register output and 15 represents a steering flip-flop for alternately switching the shift registers 12 and 13. Reference numeral 16 represents a synchronizing oscillator for transmitting the density clock 4f which is synchronized with the video clock VCLK. The synchronizing oscillator 16 transmits the density clock 4f the frequency of which is four times the clock VCLK assuming that the frequency of the clock VCLK is f to the shift registers 12 and 13. Reference numeral 111 represents a table memory for performing the light quantity modulating dither process. Reference numerals 112 and 113 represent shift registers and 110 represents light quantity modulation data.

The operation of this embodiment will now be described with reference to the circuit diagram shown in FIGS. 12 and 13, which schematically illustrate the operation of this embodiment.

Referring to FIG. 13, the addressing operation performed by the table memory 5 is the same as that according to the first embodiment as shown in FIG. 1. However, it is different from the third embodiment in that the video clock VCLK 7 is directly connected as the input for the main scanning counter 3 in the fourth embodiment.

Furthermore, there is another difference from the third embodiment in that the table memory 5 stores four binary data items (data "1" and "0" which have been dither-processed) for one address.

Therefore, the table memory 5 generates 4-bit data at the same rate time as that (same as the period of VCLK) of multivalue image data 6 supplied from the host equipment.

That is, the access speed to the table memory 5 is ¼ of that realized in the first embodiment.

According to the fourth embodiment, although the access speed to the table memory is lowered, the same process output as that of the processing circuit shown in FIG. 9 can be obtained. Then, the operation of this embodiment will now be described.

Referring to FIG. 12, reference numeral 11 represent four data lines connected to the shift registers 12 and 13. Although the dither process output as described in the embodiment shown in FIG. 3 can be obtained by 1-bit data line, the structure according to the fourth embodiment has four (8 in an ordinary memory) data lines so as to simultaneously generate four binary data items.

As can be understood from the schematic view FIG. 13 which illustrates the operation, four thresholds "34", an output denoting the results of comparisons of "24", "14" and "38" for one input image data made simultaneously by the comparators 17a to 17d are obtained in this embodiment.

That is, the table memory 5 transmits dither process data for four pixels (four bits) to the shift register 12 or 13 via the data bus in synchronization with the clock VCLK. The four bit data set to the parallel input portion of the shift registers 12 and 13 are, by the density clock (clock corresponding to 1200 dpi), finally transmitted as time sequential raster image VDO.

The structure is arranged in this such a way that the shift register 13 reads 4-bit data which corresponds to the ensuing density during transmission of data from the shift register 12 and transmits a raster image in synchronization with the inversion of the read clock in order to transmit the continuously dither processed binary data. The selector 14 selects the shift register which sequentially transmits binary data to take the video signal VDO. The 4-bit output of the table memory 105 for the light quantity modulating dither process is generated as light quantity modulation data LP110 similarly to the aforesaid VDO.

As described above, in the third embodiment, the time taken for the table memory 5 and the table memory 105 to address-access corresponds to 1200 dpi. However, in the fourth embodiment, it may be the image data access speed (speed corresponding to 300 dpi), so that an ordinary grade ROM or a RAM can be used to process the aforesaid operations. Consequently, an image process output can be made at high speed with a very simple structure. Although the two lookup table RAMs are provided for the structure according to the fourth embodiment, another structure may be employed in which one RAM the output of which is 8 bits to be divided into 4 bits for the area modulation and 4 bits for the light quantity modulation.

In the electrophotography, the density of the printed image is undesirably changed due to conditions such as the ambient temperature, humidity, the scattering of the photosensitive drums and the toner particle size development bias. That is, if light of a weak light quantity is applied, the density sometimes become substantially white-like density or substantial black-like density which is usually realized by an application of light of a strong light quantity. Therefore, even if the density gradation pattern is formed by combining the area dither and the light quantity modulation dither, the density is sometimes reversed, causing a problem to take place in that an image of an excellent gradation cannot be output.

According to a fifth embodiment of the present invention, a density gradation jump is interpolated such that the interval between the density gradation generated due to the jump is interpolated by two level light quantity modulation. In particular, the additional portion of the area irradiated with a strong light quantity from n gradations to n+2 gradations is irradiated with a weak light quantity, the undesirable reversion of the print density due to the unstable density caused generated due to the environment or conditions is prevented and the gradation quality is improved.

Figure 19:
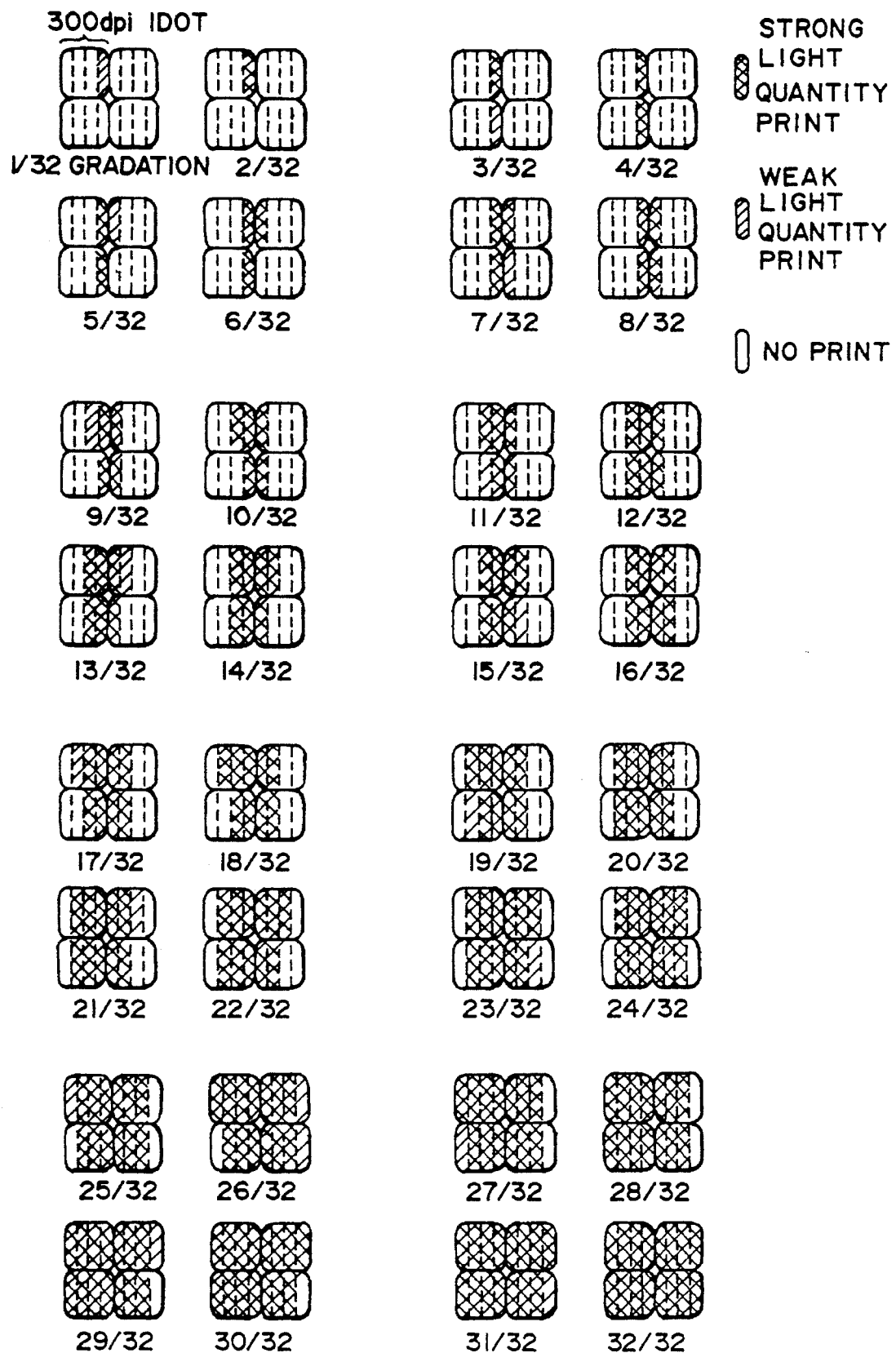
FIG. 19 illustrates dot enlargement patterns according to a fifth embodiment of the present invention.

FIG. 19 illustrates an example of the density pattern realized according to the fifth embodiment of the present invention. FIG. 19 illustrates an output density pattern with respect to an input shown in a block diagram shown in FIG. 20. According to this embodiment, a method of the following growth of the density pattern is realized.

Referring to FIG. 19, the print density is, as shown in FIG. 20, 300 dpi, the minimum unit for forming the density pattern is 2 dots in the main scanning direction and 2 dots in the sub-scanning direction and a region in one dot is sectioned into four portions; that is, one pixel is formed by 16 blocks.

Assuming that multivalue image data is 5 bits, that is data capable of expressing 32 gradations, the dot is enlarged starting from the central portion as shown in FIG. 19.

In a case where an area irradiated with a strong light quantity is added by one step in a state of n+2 gradations as compared with a state of n gradations, the additional step is irradiated with the weak light quantity at the time of n+1 gradations.

According to this embodiment, 32-gradation density can be reproduced by forming one pixel by 16 steps.

Figure 21:
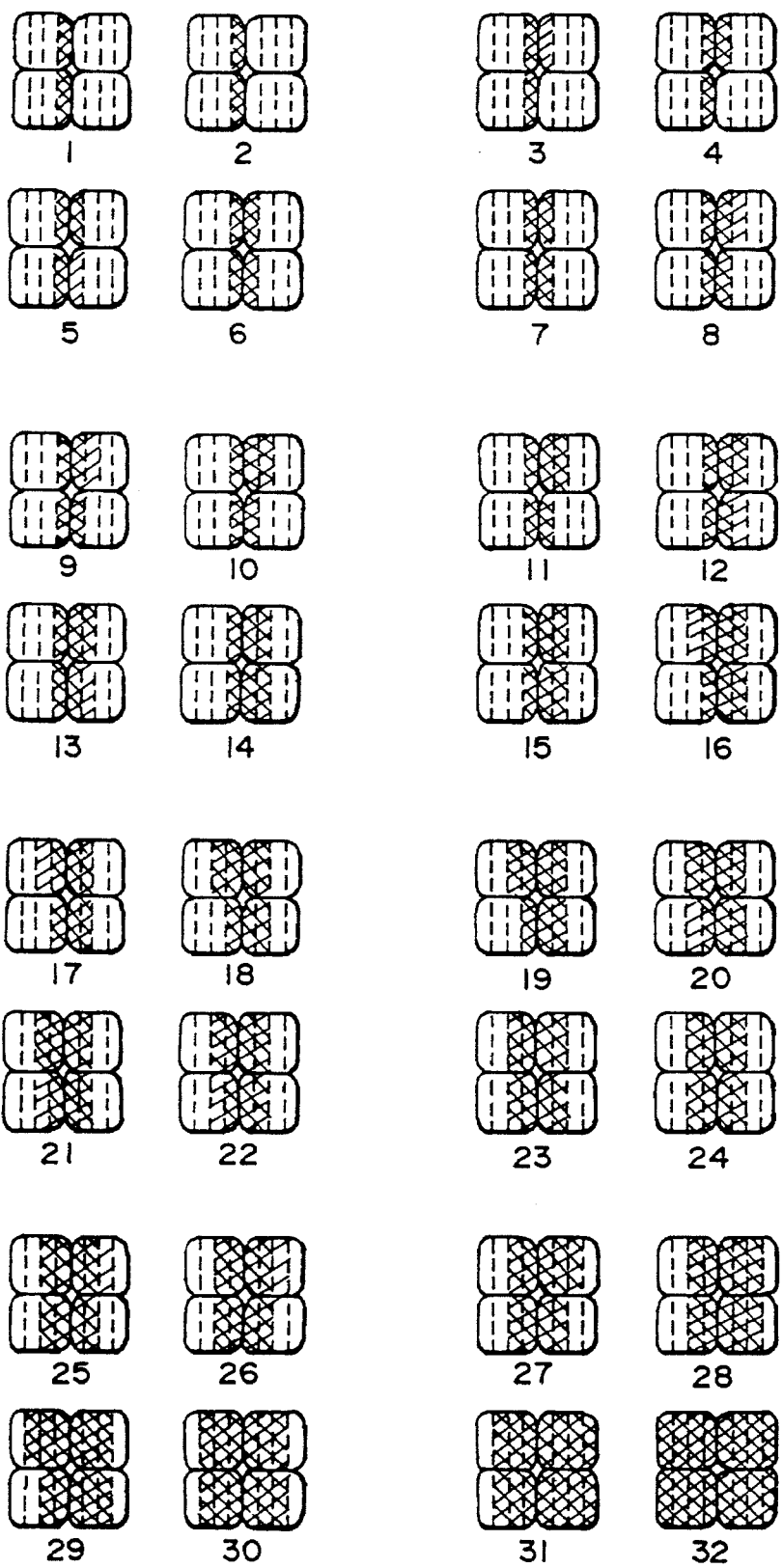
FIG. 21 illustrates dot enlargement patterns according to a sixth embodiment of the present invention.

FIG. 21 illustrates a sixth embodiment of the present invention.

FIG. 21 illustrates a density pattern in the image forming apparatus shown in FIG. 20. The density pattern according to this embodiment is a pattern in which a linear relationship is held between the input image data and the density of the printed image by performing the γ correction of the printer.

According to this embodiment, an example in which 5-bit multivalue image data, that is, gradations data is supplied in a state where 16 steps are provided in one pixel.

Referring to FIG. 21, in a case where the sixth and the seventh gradations are irradiated with 4 steps of strong light quantity and the tenth and the eleventh gradations are irradiated with 5 steps of strong light quantity, the eighth and the ninth gradations are each irradiated in such a manner that only the step added at the tenth and the eleventh gradation is irradiated with the weak light quantity and the aforesaid 4 steps are irradiated with the strong light quantity.

In a case where at least one step of the strong light quantity is changed when one gradation is changed, as in the 27-th to 32-th gradation, the weak light quantity irradiation is not performed.

As described above, the added strong light quantity irradiation portion when the n gradations is changed to the n+2 gradations is irradiated with the weak light quantity at the time of the n+1 gradations, so that the density of n+1 gradations is expressed. Therefore, even if the electrophotography process is unstable, the density from the n gradations to the n+2 gradations can be reliably realized. As a result, an image exhibiting an excellent gradation can be output.

As described above, according to this embodiment, the area of the photosensitive member irradiated with the laser beam and the irradiation light quantity strength are respectively changed in one pixel, so that the number of the gradations can be increased and thereby a pixel exhibiting excellent gradation can be output.

Since a lookup table for the irradiation area changing process and the irradiation light quantity strength changing process is used, the number of the lines, a direction in which the density pattern is enlarged and the screen angle can be changed by changing the contents of the lookup table.

Although the combination with the area modulation is described in the third and the fourth embodiments, a halftone image can be formed by transmitting one input pixel with plural strength levels for only the strength modulation.

The area modulation can be performed by another method such as the dither method, the density pattern method and the pulse width modulation method in which a comparison with a triangular wave is made or the like. Furthermore, an application to another printer such as a thermal transfer type printer can be made in this way that the strength modulation is performed with voltage applied to the thermal head and the area modulation is performed with the application time or the application area. This arrangement may be applied to an LED printer a liquid crystal printer and the like.

According to the aforesaid third to the sixth embodiments, the strength modulation can be made in one input pixel and thereby a multigradation halftone image can be formed solely or combined with the area gradation.

A semiconductor laser driver circuit in which the present invention can be embodied will now be described.

The laser driver circuit is a circuit which is capable of transmitting strong light quantity and the weak light quantity and to which the output from the processing circuit according to the third to the sixth embodiments is applied.

Figure 22:
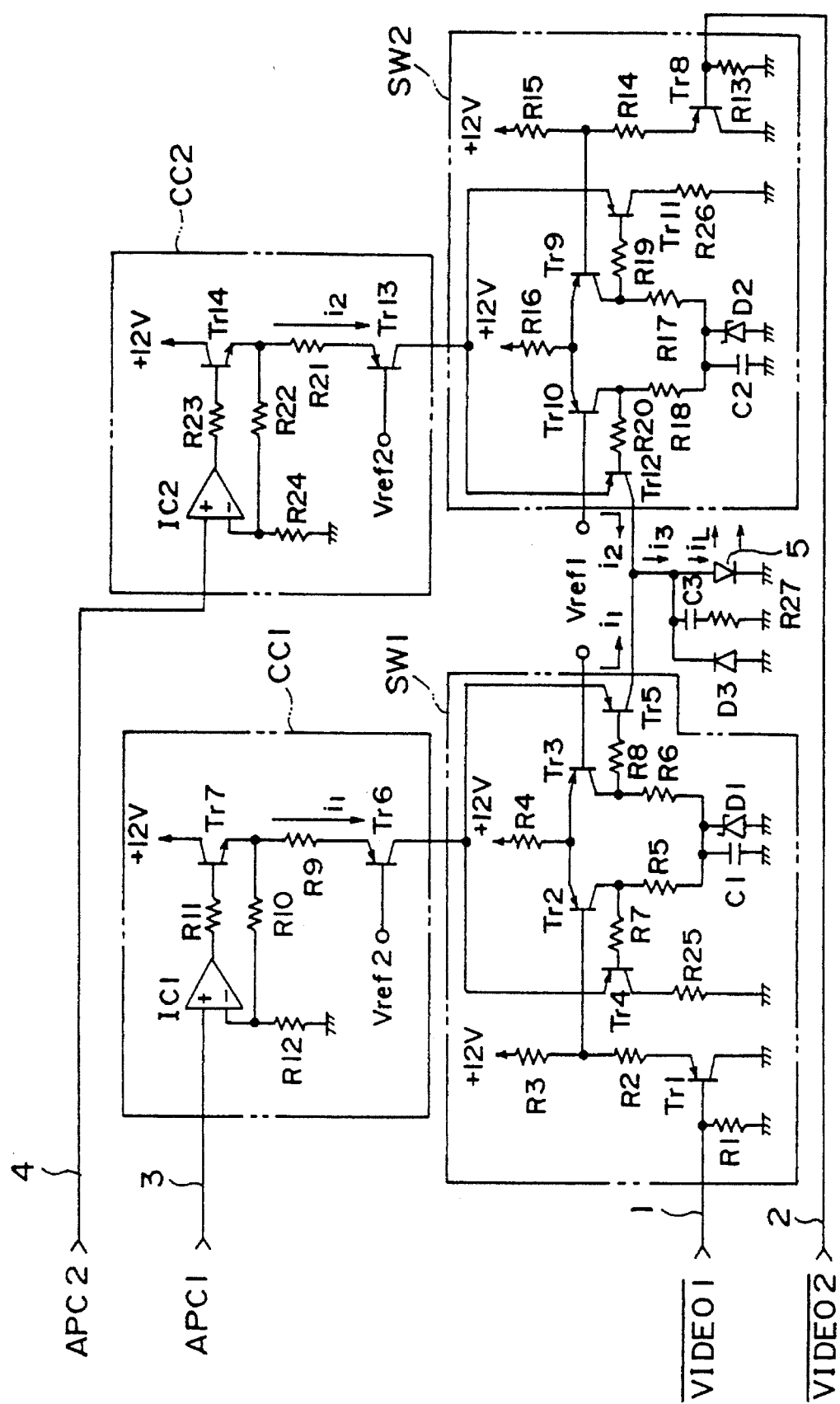
FIG. 22 is a circuit diagram for use in a structure according to a seventh embodiment of the present invention.

FIG. 22 is a circuit diagram for use in a laser drive apparatus according to a seventh embodiment of the present invention. The laser drive circuit for transmitting two level light, that is a standard light quantity and the weak light quantity will now be described. Referring to FIG. 22, transistors Tr1 to Tr5, resistors R1 to R8 and R25, a Zener diode D1 and a capacitor C1 form a first switching circuit SW1. Transistors Tr8 to Tr12, resistors R13 to R20 and R26, a Zener diode D2 and a capacitor C2 form a second switching circuit SW2. Transistors Tr6, Tr7, an OP-amplifier IC1 and resistors R9 to R12 form a first constant current circuit CC1. Transistors Tr13, Tr14, an OP-amplifier IC2 and resistors R21 to R24 form a second constant current circuit CC2.

The first switching circuit SW1 and the first constant current circuit CC1 supply drive current $i_1$ required to emit weak light quantity to the semiconductor laser 5. The second switching circuit SW2 and the second constant current circuit CC2 supply drive current $i_2$ required to increase the light quantity from the weak light quantity to a standard light quantity to the semmicoductor laser 5. That is, the semiconductor laser 5 is caused to emit weak light quantity light by the current $i_1$ supplied thereto, while the same is caused to emit standard light quantity light by the curmet $i_1+i_2$ supplied thereto. The first switching circuit SW1 switches the supply/stop of the current $i_1$ to the semiconductor laser 5 in response to first image signal VIDEO1. The second switching circuit SW2 switches the supply/stop of the current $i_2$ to the semiconductor laser 5 in response to second image signal VIDEO2. The first constant current circuit CC1 determines the current $i_1$ in response to first laser light quantity control signal APC1 which is an analog signal transmitted from a D/A port of a laser light quantity control CPU (omitted from illustration). The second constant current circuit CC2 determines the current $i_2$ in response to second laser light quantity control signal APC2 which is an analog signal transmitted from a D/A port of a laser light quantity control CPU (omitted from illustration).

Then, the operation of the circuit shown in FIG. 22 will now be described. Assuming that the first laser light quantity control signal APC1 to be received by the first constant current circuit CC1 is $v_a$ [V] and R10=R12, a potential of $2v_a$ [V] is generated at the emitter of the transistor Tr7. Since reference voltage $V_{ref}2$ [V] has been supplied to the base of the transistor Tr6, the emitter potential of the transistor Tr6 is $V_{ref}2+V_{be}$ [V]. As a result the current $i_1$ passing through the resistor R9 becomes:

$$i_1 = \frac{2V_a - (V_{ref}2 + V_{be})}{R9} \quad [A]$$

In this constant current circuit, even if the power supply voltage+12 V is changed or ripple noise affects, the current value is not changed in a case where APC1 and $V_{ref}2$ are not changed. Therefore, a stable constant current circuit can be constituted.

Assuming that VIDEO1 supplied to the first switching circuit SW1 is a signal transmitted from TTL (omitted from illustration) and is a two level signal of $V_H$ [V] and $V_L$ [V], base potentials $V_{B2(H)}$ and $V_{B2(L)}$ of the transistor Tr2 are as follows in a case where R2=R3:

$$V_{B2(H)1} = \frac{12 - (V_H - V_{be})}{2} \quad [V]$$

$$V_{B2(L)} = \frac{12 - (V_L - V_{be})}{2} \quad [V]$$

In this state, an assumption is made that $$V_{ref1} = \frac{V_{B2(H)} + V_{B2(L)}}{2} \quad [V]$$

In this case a relationship $V_{B2(L)}<V_{ref}1$ is held if image signal VIDEO1 is $V_L$[V]. Therefore, current $i_{C2}$ [A] passes between the emitter and the corrector of the transistor Tr2 of the two transistors Tr2 and Tr3 which constitute the differential switching circuit. As a result, the base potential of the transistor Tr4 is made $V_{D1}+i_{C2}$ [V]×R5 [V], while the base potential of the transistor Tr5 is made about $V_{D1}$ [V] because no current passes between the emitter and the collector of Tr5. Since Tr4 and Tr5 constitute the differential switching circuit and the base potential of the transistor Tr5 is lower than the base potential of Tr4, i [A] set in the aforesaid constant current circuit passes between the emitter and the collector of Tr5 before it is supplied to the semiconductor laser 5. On the other hand, no current passes the resistor R25 and between the emitter and the corrector of the transistor Tr4. By making Zener voltage $V_{D1}$ of the Zener diode D1 to be higher than operation voltage $V_{LD}$ of the semiconductor laser 5 and by differential-switching the transistors Tr4, Tr5, Tr2 and Tr3 in an unsaturated region, high speed switching can be performed and the transistors can be switched while eliminating a necessity of charging time. Therefore, the semiconductor laser 5 can be turned on while preventing the deterioration of the pulse width of image signal VIDEO 1.

Since $V_{B2(H)}>V_{ref}1$ if image signal VIDEO1 is $V_H$ [V], current $i_1$ [A] does not pass through the semiconductor laser 5 due to the same operation but the it is supplied to the transistor R25.

Figure 23A:
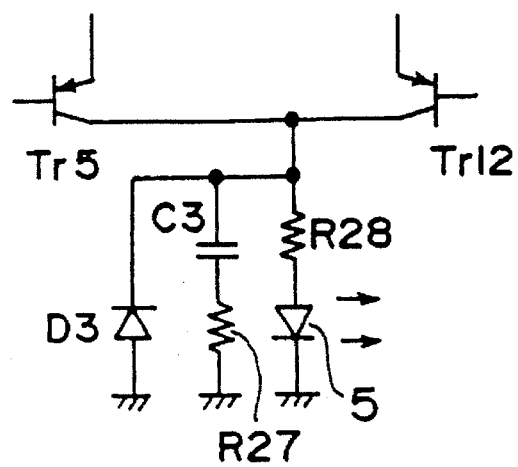
FIGS. 23A and 23B are circuit diagrams which illustrate the structures of essential portions of modifications to the seventh embodiment of the present invention.
Figure 23B:
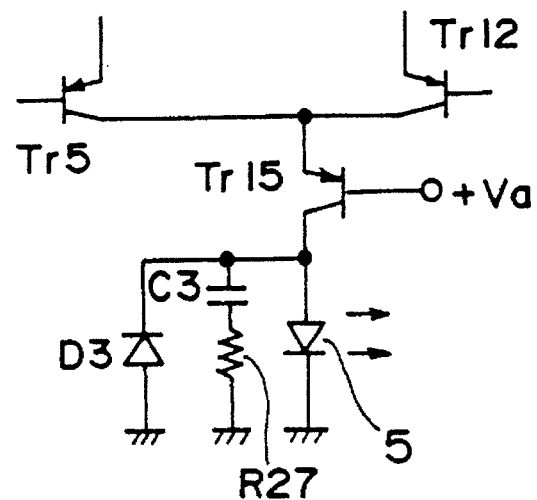

Since the operations of the second switching circuit SW2 and the second constant current circuit CC2 are the same as those of the first switching circuit SW1 and the first constant current circuit CC1, their descriptions are omitted here. In a case where the currents $i_1$ and $i_2$ generated by the first and the second constant current circuits CC1 and CC2 are added, current $i_3$ [A] passes through the semiconductor laser 5 as the laser drive current. In this embodiment, the collector current $i_1$ of Tr5 and the collector current $i_2$ of Tr12 flow, as $i_3$, in a direction designated by an arrow. Therefore, the Zener voltage of the Zener diode D1 and that of D2 are made to be the same. Furthermore, a series circuit composed of C3 and R27 connected to the semiconductor laser 5 in parallel acts to prevent the flow of the overshoot and the undershoot of the current $i_3$ to the semiconductor laser 5. The diode D3 protects the semiconductor laser 5 from a large reverse voltage. A modification arranged as shown in FIGS. 23A and 23B may be employed in which a device is disposed between the semiconductor laser 5 and the transistors Tr5 and Tr12.

Figure 24:
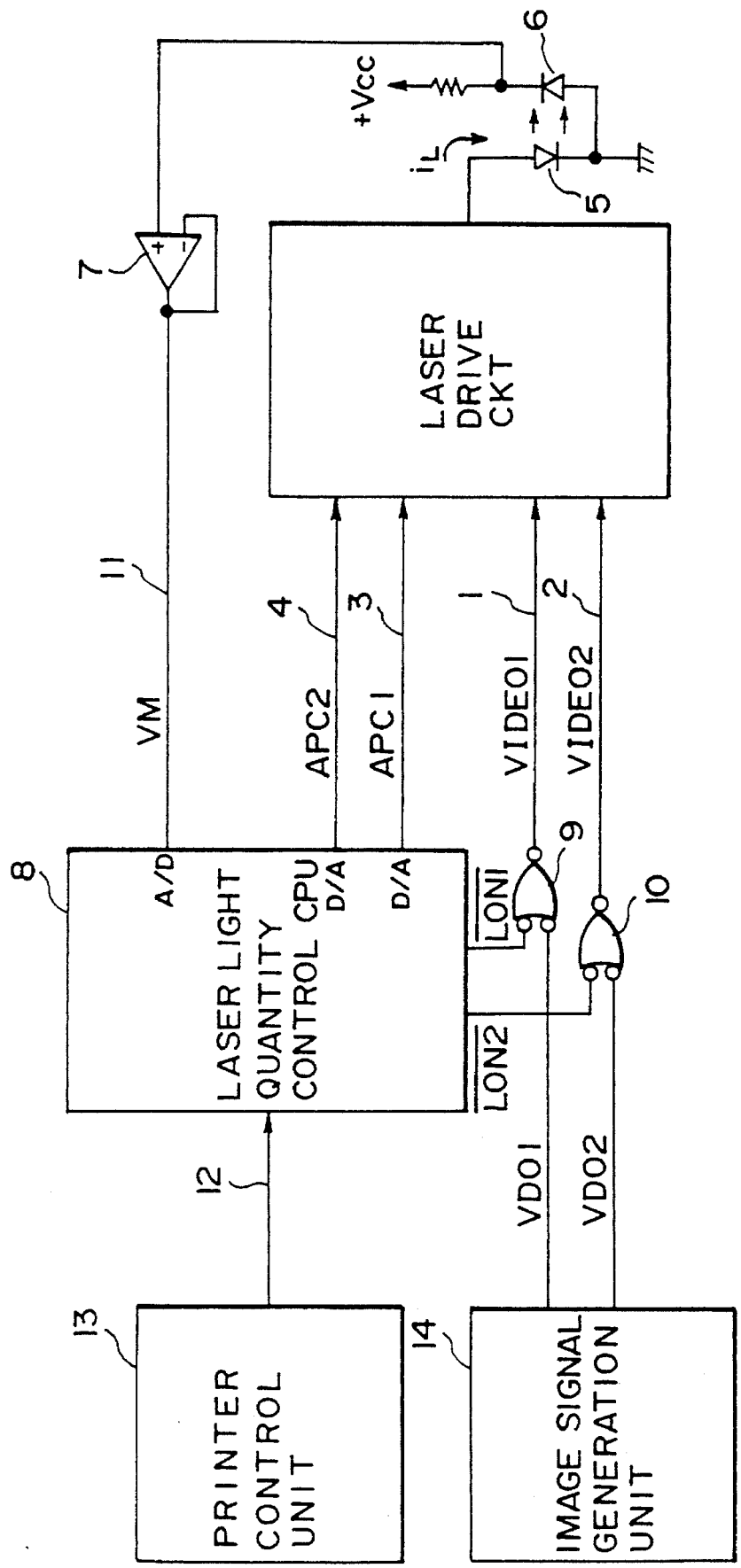
FIG. 24 is a block diagram which illustrates the peripheral structure of a laser drive circuit according to the seventh embodiment of the present invention.

A method of determining the aforesaid first laser light quantity control signal APC1 and the second laser light quantity control signal APC2 will now be described. FIG. 24 is a block diagram which illustrates a portion including the laser drive circuit.

Figure 26:
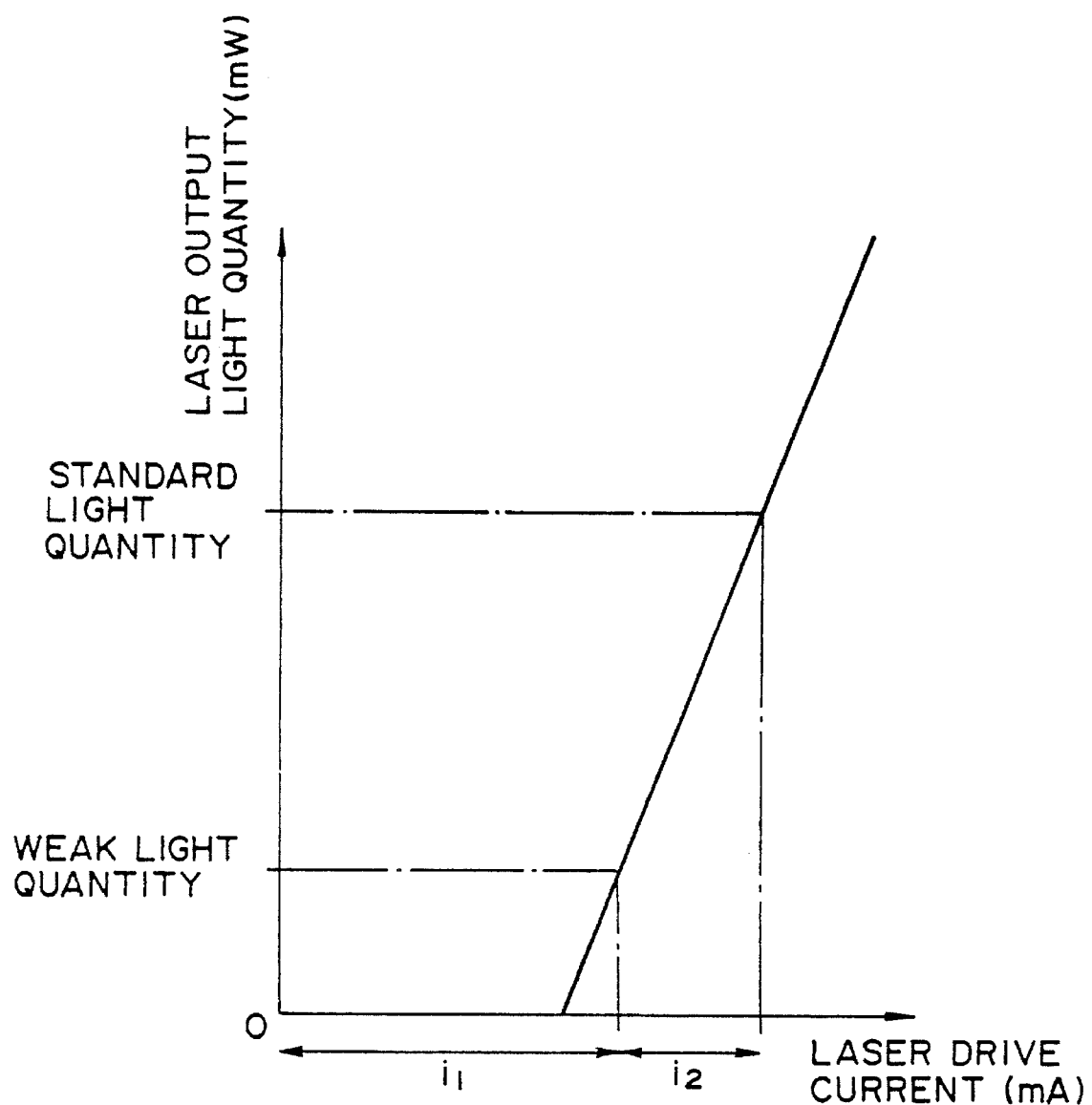
FIG. 26 is a graph which illustrates a drive current and an output light quantity of a laser semiconductor.

When a laser light quantity setting start signal 12 is transmitted from a printer control portion 13 which controls the overall body of the printer engine to a laser light quantity control CPU8 at the time of the power supply or during the printing operation of each page (FIGS. 25A to 25L illustrate each waveform and timing, FIG. 26 illustrates the relationship between the standard light quantity and the weak light quantity in the relationship between the current and the laser light output, and FIG. 27 is a flow chart which illustrate the operation of the laser light quantity control CPU8). When the laser light quantity setting operation is commenced, the laser light quantity control CPU8 makes laser force turn-on signal LON1 to be effective to gradually raise the analog voltage of APC1 while monitoring output voltage $V_M$ of a photodiode 6 for monitoring the laser beam and maintains the voltage of APC1 when the laser beam monitor voltage $V_M$ reaches the voltage which corresponds to a target value of the weak light quantity. Then, LON2 is made effective while maintaining the effective laser force turn-on signal LON1 to gradually raise the analog voltage of APC2 while monitoring the laser beam monitor voltage $V_M$. Then, the voltage of the APC2 when the laser beam monitor voltage $V_M$ reaches the voltage which corresponds to the standard light quantity is held. After the aforesaid operations have been completed, the laser force turn-on signals LON1 and LON2 are made ineffective and thus the laser beam quantity setting operation is completed. Then, the printing operation is started.

Table 1 shows the relationship between VIDEO1, VIDEO2, the laser drive current and the laser beam output.

TABLE 1

| Laser beam output | Laser drive current | VIDEO1 | VIDEO2 |
| --- | --- | --- | --- |
| Turned off | 0 | H | H |
| Weak light quantity | $i_1$ | L | H |
| Standard light quantity | $i_1 + i_2$ | L | L |

It is preferable that the weak light quantity be 30% of the standard light quantity.

A description will now be made about a smoothing process in which the aforesaid laser drive circuit is used to smooth the notches of characters, figures and diagonal line portion.

Referring to FIG. 24, an image signal generating unit 14 includes a smoothing circuit so that edges of characters can be smoothed by controlling the semiconductor laser in response to the two transmitted image signals VDO1 and VDO2.

Figure 28:
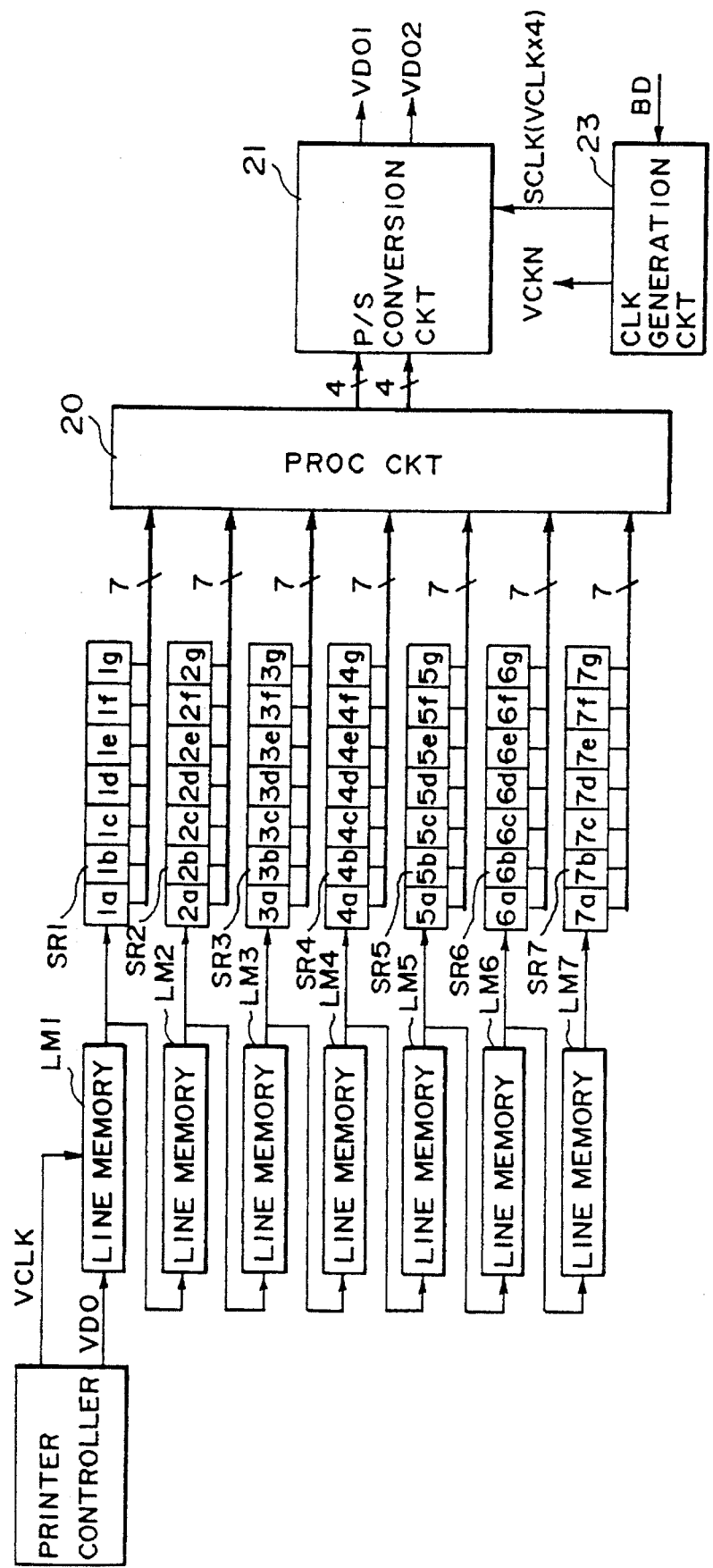
FIG. 28 is a block diagram which illustrates the structure of the image signal generation unit 14 shown in FIG. 25.

FIG. 28 is a block diagram which illustrates the smoothing circuit included in the image signal generating unit 14. A printer controller transmits image signal VDO for 1 bit in synchronization with image clock VCLK and data about 7 lines in the main scanning direction is stored in line memories LM1 to LM7. Data for 7 dots from respective line memories is stored in shift registers SR1 to SR7. That is, assuming that cell 4d of the shift register SR5 is the subject pixel, image information about a reference region of 7×7 dots around the subject pixel is always stored in the shift registers 1 to 7. Information of 49 dots in all is supplied to a processing circuit 20 to discriminate that the subject portion is the diagonal line portion. In this case, a 4-bit signal for changing the subject pixel is transmitted to a parallel/serial (P/S) conversion circuit 21 to transmit as a serial signal at a frequency clock which is four times the image clock VCLK to make it as image signal VDO1.

Figure 29:
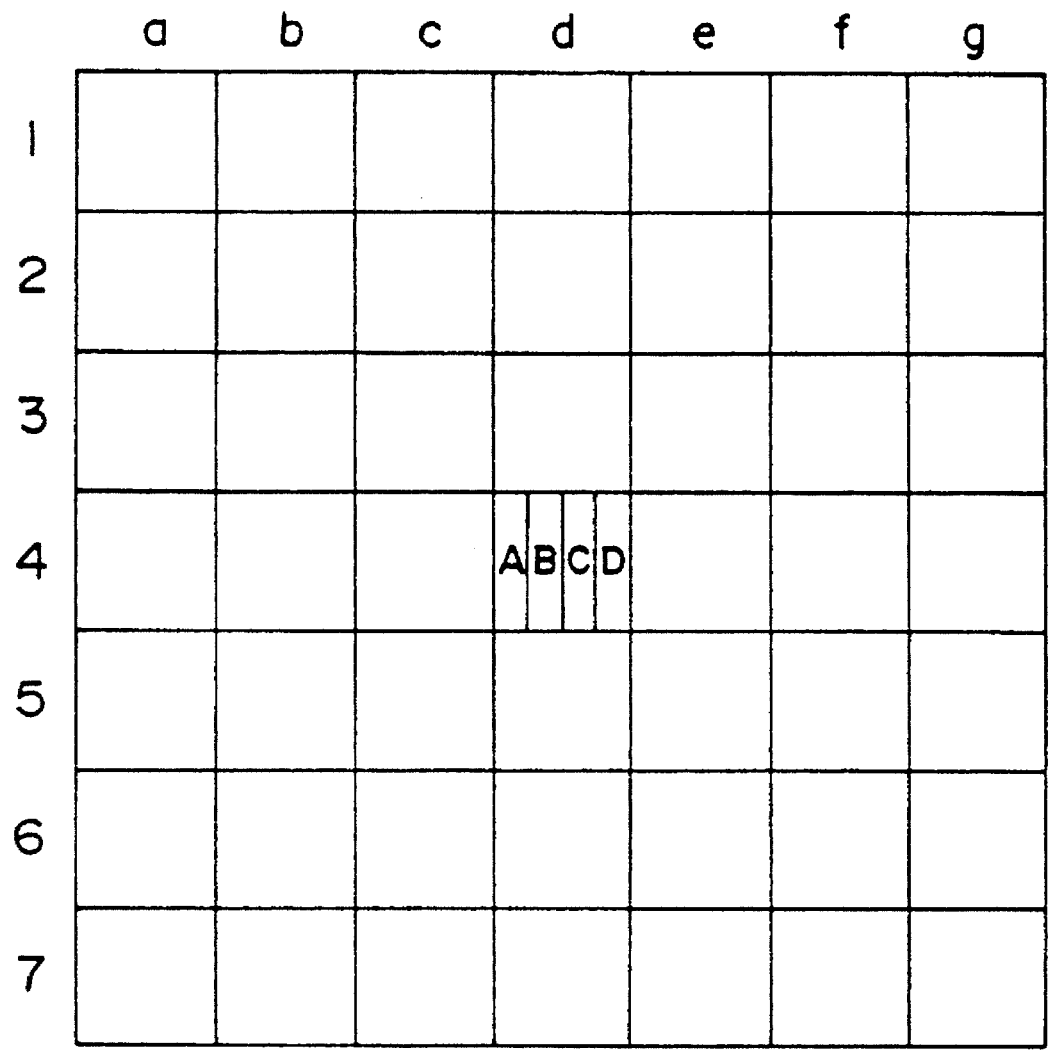

Similarly, image signal VDO2 is generated. FIG. 29 illustrates a reference region around the subject cell 4d. In this embodiment, image information around the subject pixel is used to section the subject pixel into four positions (A, B, C and D) to perform the area modulation. FIG. 30 illustrates an example of results of the smoothing operation.

Figure 31:
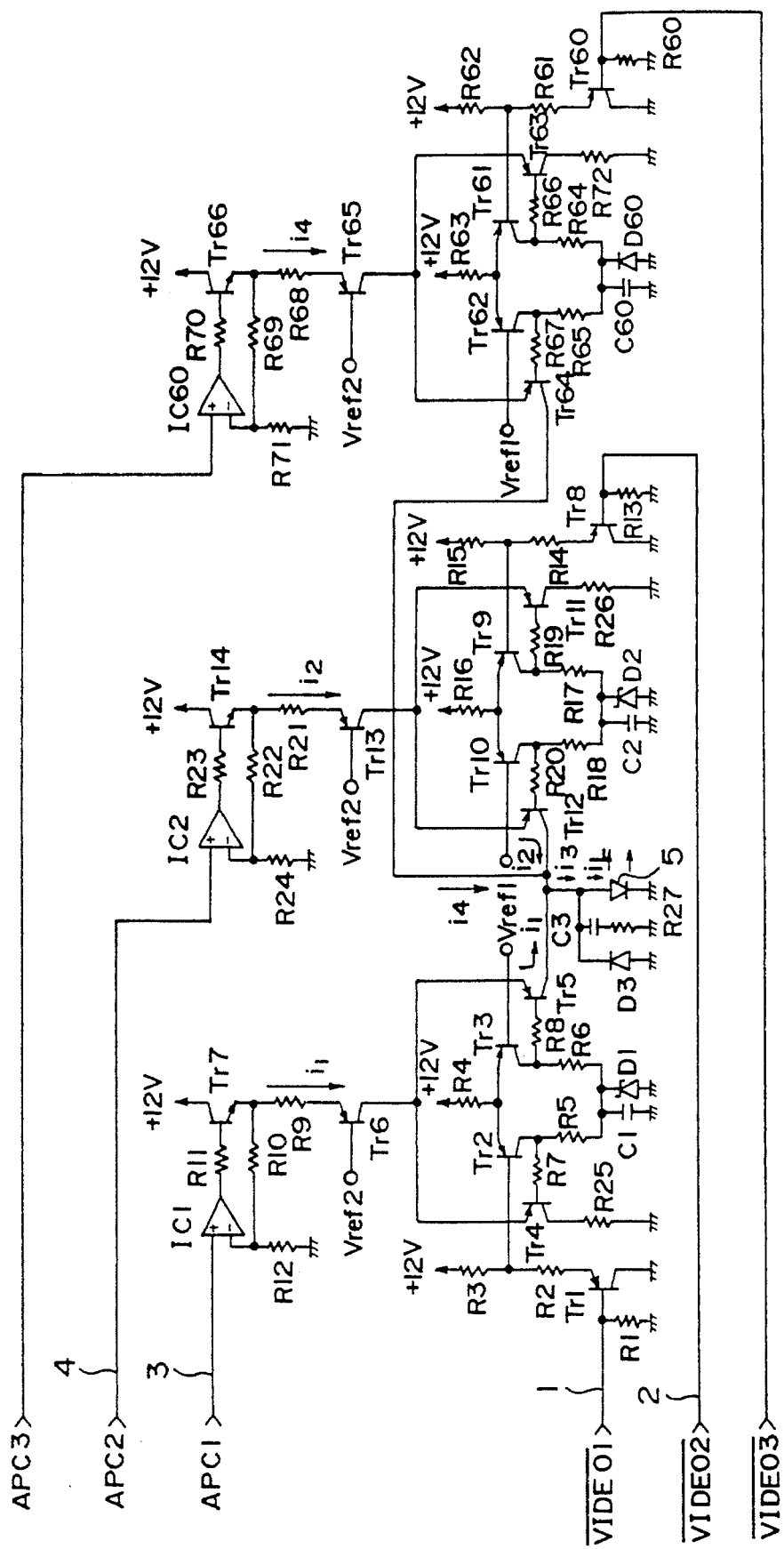
FIG. 31 is a circuit diagram which illustrates the structure of an eighth embodiment of the present invention.

FIG. 31 illustrates a laser drive apparatus according to an eighth embodiment of the present invention. In this embodiment, three constant current circuits and three switch circuits are provided, so that four kinds of laser light quantities can be selected as shown in Table 2.

TABLE 2

| Laser beam output | Laser drive current | VIDEO1 | VIDEO2 | VIDEO3 |
| --- | --- | --- | --- | --- |
| Turned off | 0 | H | H | H |
| First light quantity level | i1 | L | H | H |
| Second light quantity level | i1 + i2 | L | L | H |
| Third light quantity level | i1 + i4 | L | H | L |
| Fourth light quantity level | i1 + i2 + i4 | L | L | L |

For example, letting the fourth light quantity level be the standard light quantity, the first, the second and the third light quantity levels are respectively 30%, 50% and 70% of the standard light quantity.

Figure 32:
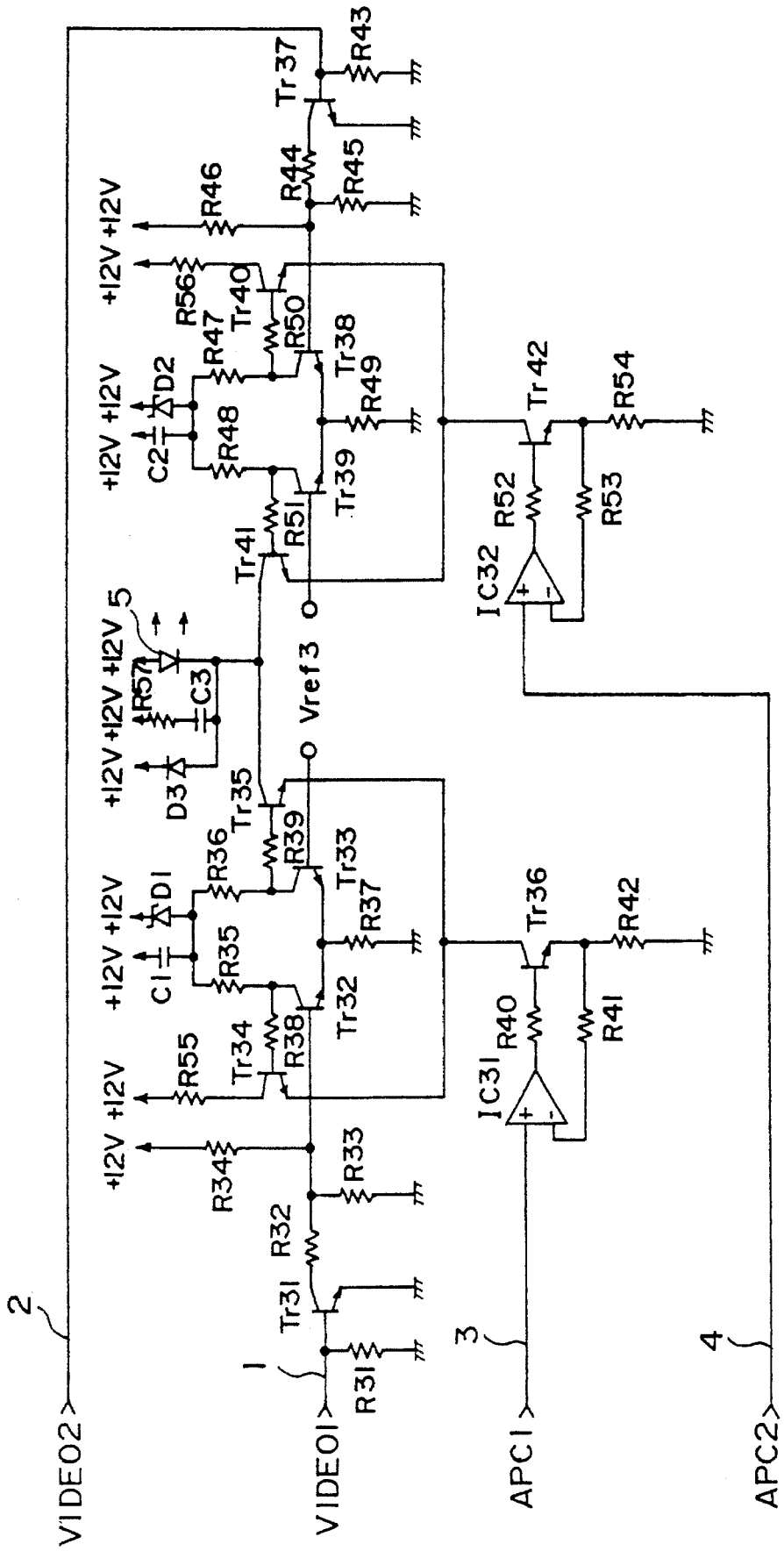
FIG. 32 is a circuit diagram which illustrates the structure of a ninth embodiment of the present invention.
Figure 33:
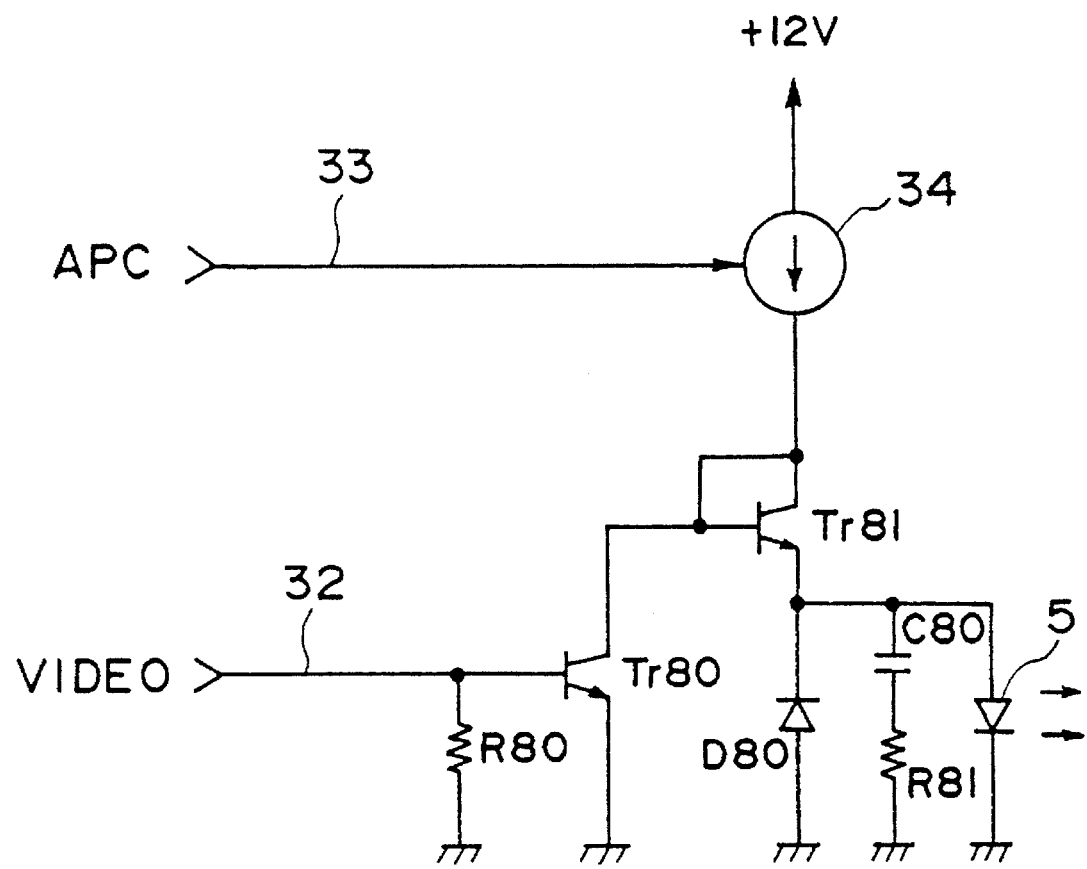
FIG. 33 is a circuit diagram which illustrates a laser drive circuit according the conventional structure.
Figure 34:
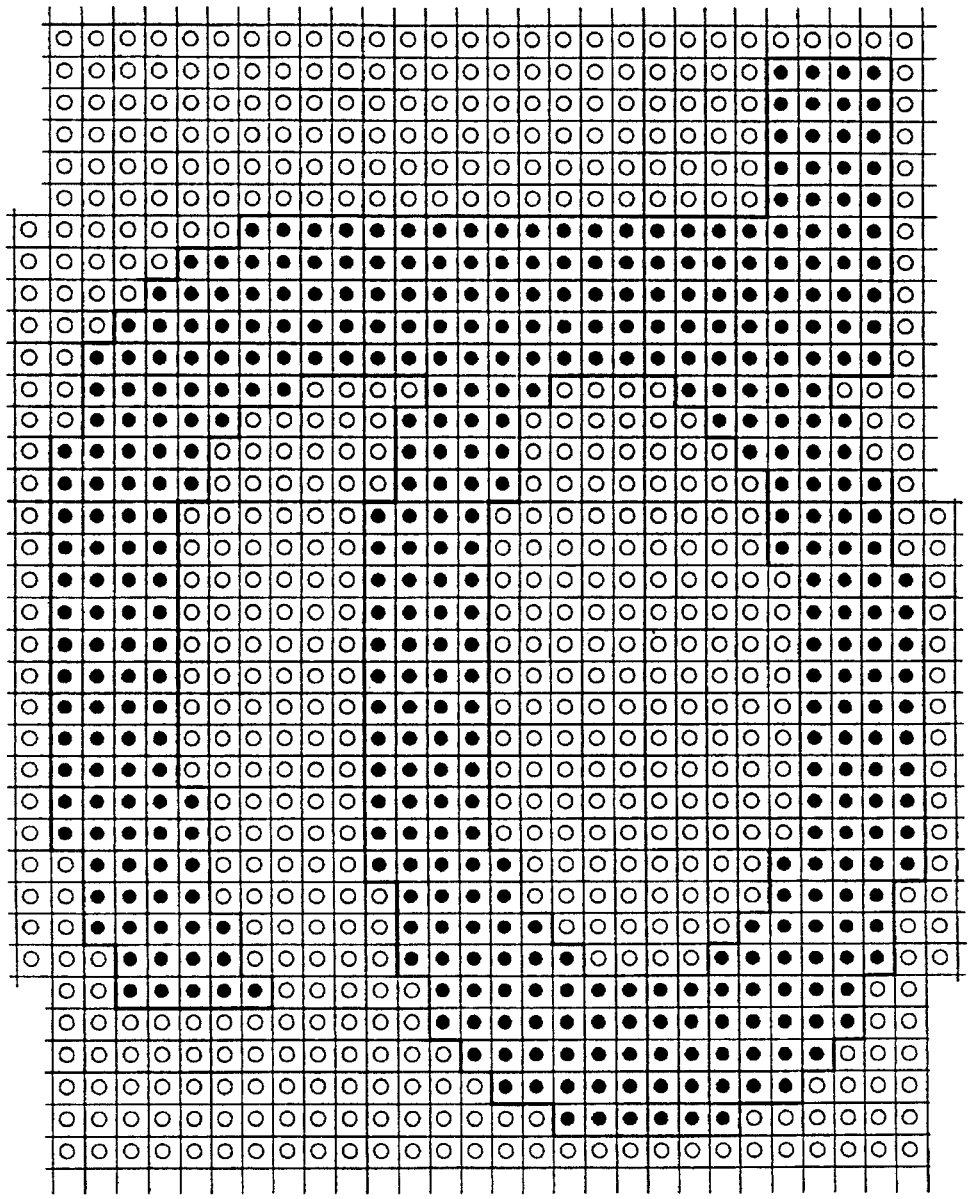
FIG. 34 illustrates an example of a printed image according to the conventional structure.

The laser drive circuit according to the seventh and the eighth embodiments is a circuit for driving a laser in which the cathode of the semiconductor laser and the anode of the photodiode are connected to the stem. A ninth embodiment is shown in FIG. 32 which illustrates an example of a circuit for driving a laser of a type in which the anode of the semiconductor laser and the cathode of a monitoring photodiode are connected to the stem. In the ninth embodiment, all of the transistors are npn-transistors. The structure according to this embodiment is simplified such that the first constant current circuit is formed by the transistor Tr36, the OP-amplifier IC31 and resistors R40 to R42 and the second constant current circuit is formed by the transistor Tr42, the op-amplifier IC32 and resistors R52 to R54.

According to the seventh to the ninth embodiments, high speed response can be realized and the circuit can easily be made to be an IC circuit because all of the transistors are npn transistors.

As a result of the circuit structure, the semiconductor laser can be subjected to a light quantity modulation in a plurality of levels and thereby further smooth characters and halftone images exhibiting excellent gradience can be obtained.

Although the invention has been described in its preferred form with a certain degree of particularly, it is understood that the present disclosure of the preferred form may be changed in the details of construction and the combination and arrangement of parts may be resorted to without departing from the spirit and the scope of the invention, which is defined as hereinafter claimed.

What is claimed is:

1. An image processing apparatus comprising:
   input means for receiving a multivalue image signal;
   generating means for generating a plurality of clock counts;
   selection means for selecting one clock count from said plurality of clock counts in accordance with a value of the multivalue image signal;

count means for counting the selected count clock; and pulse width modulation means for performing a pulse width modulation by using an output from said count means and the multivalue image signal received by said input means.

2. An image processing apparatus according to claim 1, wherein said plurality of count clocks have different phases from one another.

3. An image processing apparatus according to claim 1, wherein said plurality of count clocks have different frequencies from one another.

4. An image processing apparatus according to claim 1, wherein said generating means generates a first count clock having a frequency higher than the frequency of an image clock, a second count clock the phase of which is realized by reversing the phase of said first count clock and a third count clock obtained by dividing said first count clock.

5. An image processing apparatus according to claim 1, wherein said selection means selects in advance one clock from among said plurality of clocks in accordance with a count value of said count means.

6. An image processing apparatus according to claim 5, wherein said selection means receives the count value and the multivalue image signal as address information to transmit a selection signal for selecting a desired count clock.

7. An image processing apparatus comprising:

input means for receiving a multivalue image signal;

generating means for generating a plurality of count clocks;

selection means for selecting one count clock from said plurality of count clocks;

count means for counting the selected count clock; and pulse width modulation means for performing a pulse width modulation by using an output from said count means and the multivalue image signal received by said input means;

wherein said selection means selects from among said plurality of count clocks in accordance with a count value of said count means.

8. An image processing apparatus according to claim 7, wherein said plurality of count clocks have different phases from one another.

9. An image processing apparatus according to claim 7, wherein said plurality of count clocks have different frequencies from one another.

10. An image processing apparatus according to claim 7, wherein said generating means generates a first count clock having a frequency higher than the frequency of an image clock, a second count clock the phase of which is realized by reversing the phase of said first count clock and a third count clock obtained by dividing said first count clock.

11. An image processing apparatus according to claim 7, wherein said selection means further selects one clock from among said plurality of clocks in accordance with a value of the multivalue image signal.

12. An image processing apparatus according to claim 11, wherein said selection means receives said count value and said multivalue image signal as address information to transmit a selection signal for selecting a desired count clock.

13. An image processing method for use in an image forming apparatus for applying light to a photosensitive material in accordance with multivalue image data to form a halftone density image, said image processing method comprising the steps of:

controlling an irradiation light quantity to strong and weak levels;

irradiating a portion, which is added when the multivalue image data is changed from n gradations to n+2 gradations and which is irradiated with light of the strong light quantity, with light of the weak light quantity at n+1 gradations; and inhibiting weak light quantity irradiation in a case where the portion, which is added when the multivalue image data is changed from n gradations to n+2 gradations and which is irradiated with the light of the strong light quantity, has an area which is two times or larger a minimum unit area which can be controlled.

* * * * *